(12) United States Patent
Iwasaki

(10) Patent No.: US 7,224,877 B2
(45) Date of Patent: May 29, 2007

(54) COMMUNICATION SYSTEM USING SHEET LIGHT GUIDE

(75) Inventor: Osamu Iwasaki, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/043,952

(22) Filed: Jan. 28, 2005

(65) Prior Publication Data

US 2005/0163442 A1    Jul. 28, 2005

(30) Foreign Application Priority Data

Jan. 28, 2004    (JP)    ............... 2004-019969

(51) Int. Cl.
*G02B 6/13*    (2006.01)
(52) U.S. Cl. ................... 385/130; 385/14; 385/24
(58) Field of Classification Search ............ None
See application file for complete search history.

(56) References Cited

U.S. PATENT DOCUMENTS 4,641,376 A * 2/1987 Rozenwaig et al. .......... 398/55
5,542,017 A   7/1996 Koike
5,548,670 A   8/1996 Koike
5,602,663 A * 2/1997 Hamaguchi et al. .......... 398/79
5,604,748 A * 2/1997 Date et al. .................. 370/449
5,822,475 A  10/1998 Hirota et al.
6,907,177 B2 * 6/2005 Iwasaki et al. .............. 385/129

FOREIGN PATENT DOCUMENTS

JP    11-31035 A    2/1999

OTHER PUBLICATIONS

"High-Uniformity Star Coupler Using Diffused Light Transmission" IEICE Trans. Electron, vol. E84C, No. 3, Mar. 2001 p. 339.

* cited by examiner

Primary Examiner—Michelle Connelly-Cushwa
Assistant Examiner—Jerry T Rahll
(74) Attorney, Agent, or Firm—Sughrue Mion, PLLC

(57) ABSTRACT

In a communication system using a sheet light guide (10) which is formed to contain light-scattering particles in a sheet optical medium and propagates signal light incident from one end surface thereof to the other end surface side while scattering the signal light by the particles, a photodetector (55) which is coupled to the other end surface of the sheet light guide (10) and detects the signal light and a demultiplexer (84) which distributes an output of the photodetector (55) to a plurality of lines are provided.

16 Claims, 26 Drawing Sheets

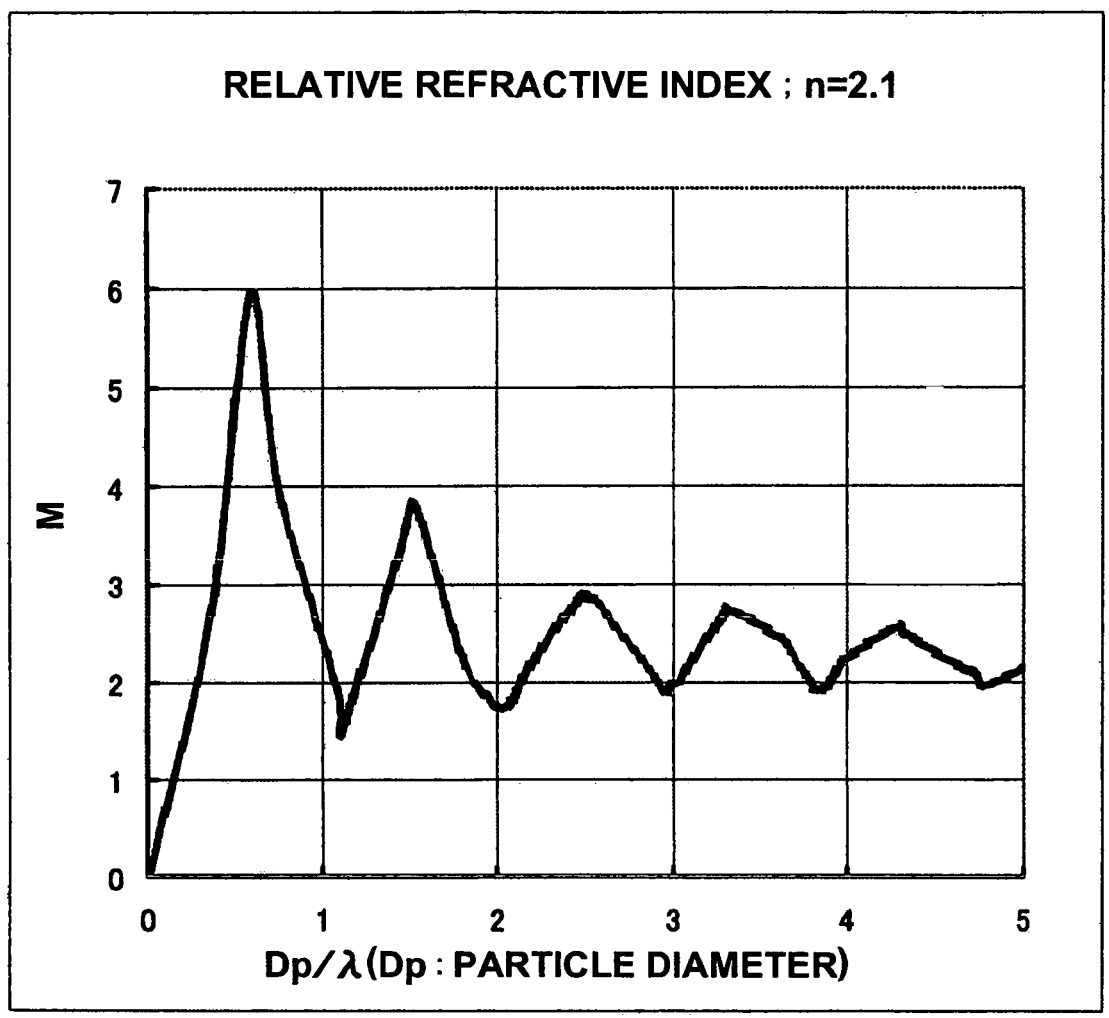

RELATIONSHIP BETWEEN PARTICLE DIAMETER AND
PARTICLE DENSITY WHEN LIGHT EXTRACTION EFFICIENCY IS 80%

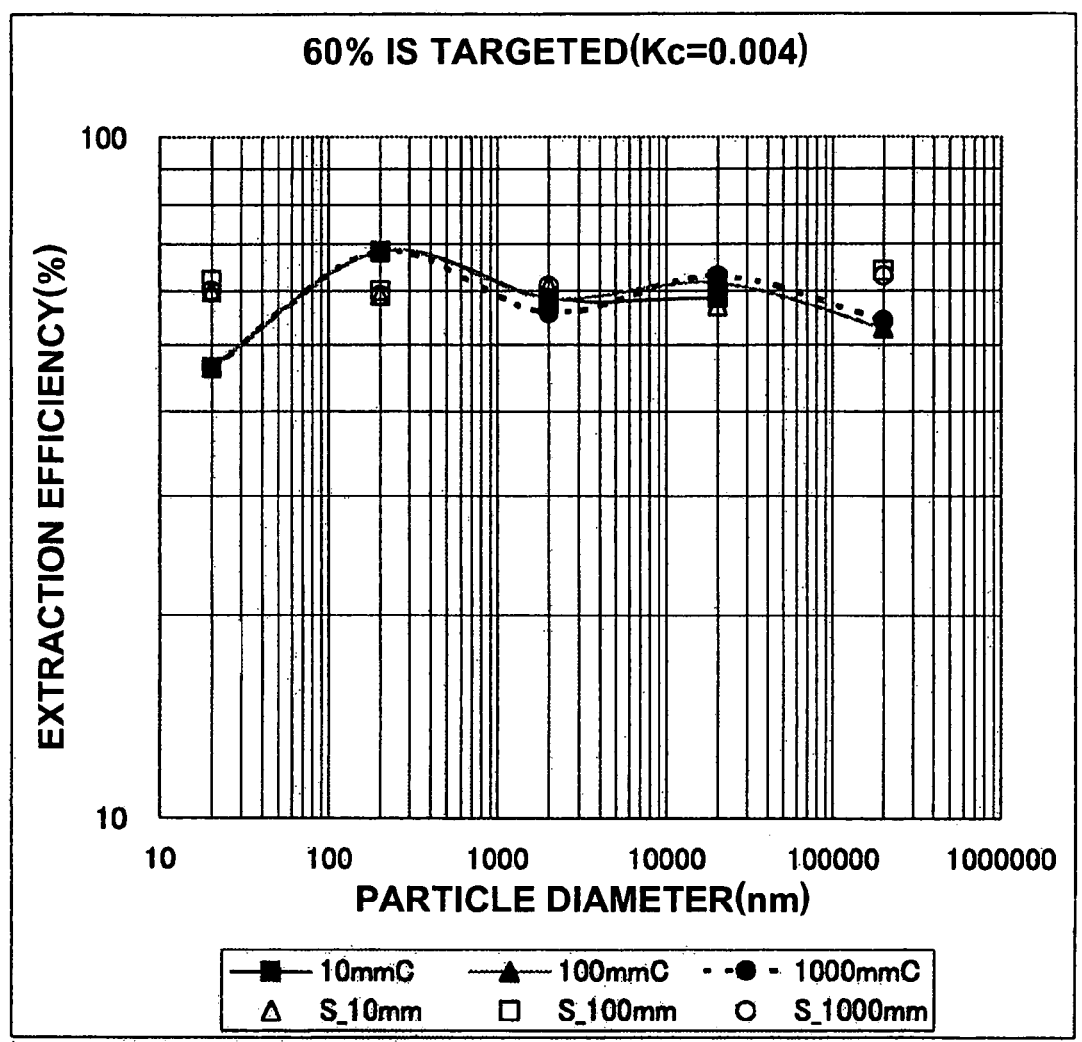

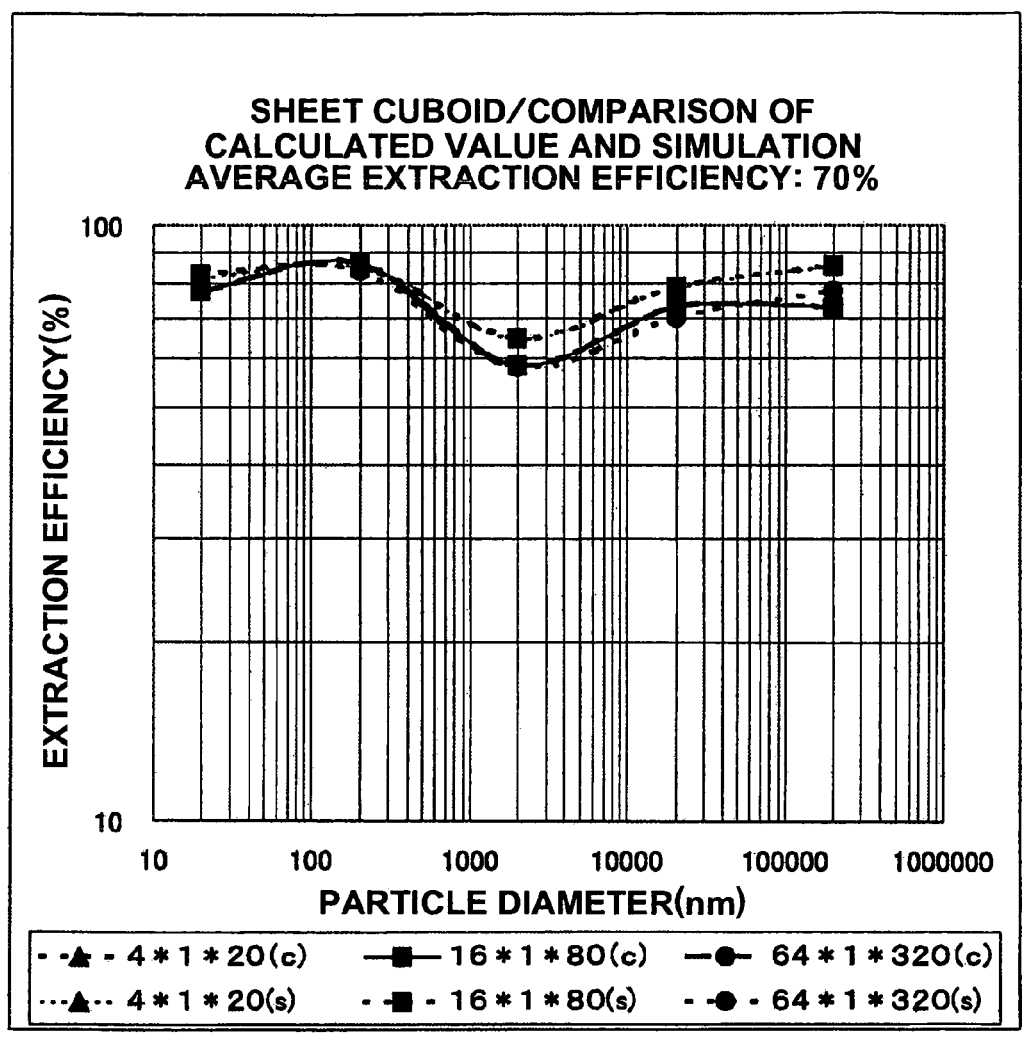

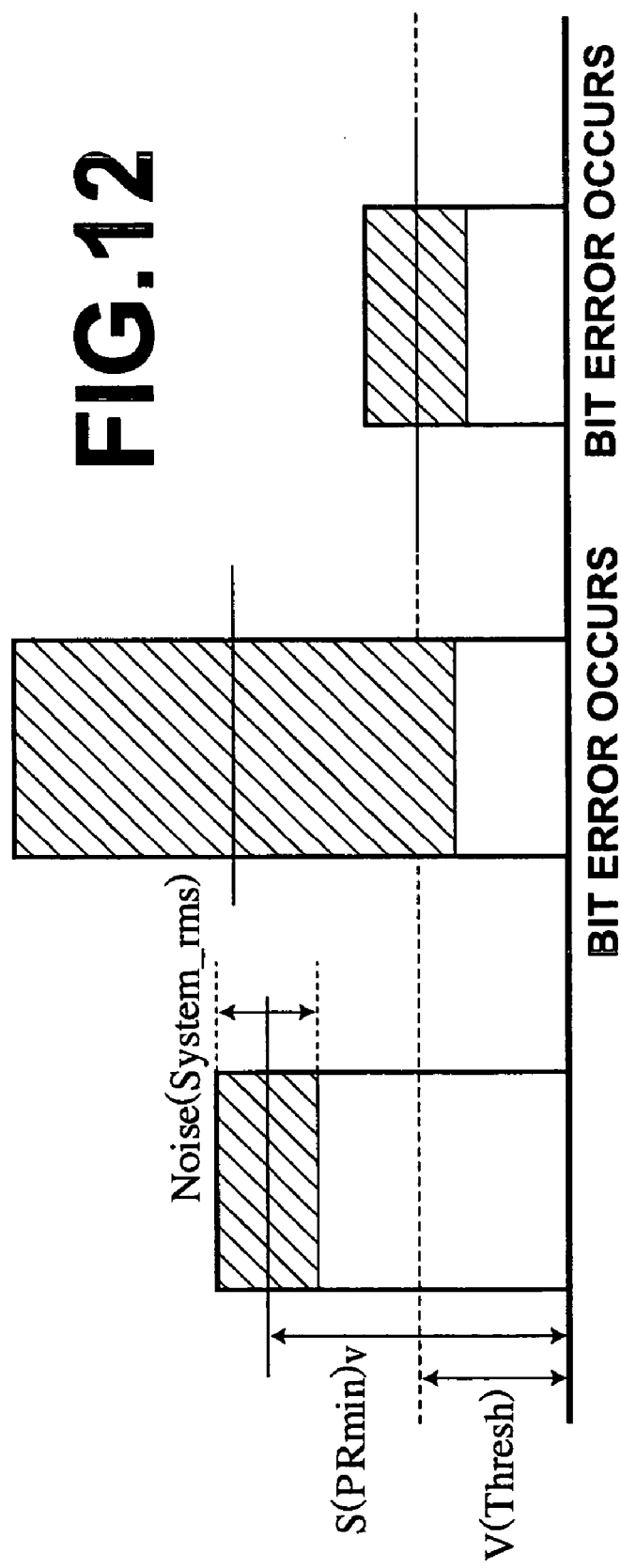

COMMUNICATION SYSTEM USING SHEET LIGHT GUIDE

BACKGROUND OF THE INVENTION

1. Field of the Invention

The present invention relates to a communication system using a light guide, and particularly to a sheet light guide which is formed to contain light-scattering particles in a sheet optical medium and propagates light incident from one end surface thereof to the other end surface side while scattering the light by the particles.

2. Description of the Related Art

Heretofore, for example, as described in U.S. Pat. Nos. 5,548,670 and 5,542,017, a light guide has been known, which is formed to contain light-scattering particles in an optical medium such as polymethylmethacrylate (PMMA), and propagates light incident from one end surface thereof to the other end surface side while scattering the light by the particles.

Such a light guide propagates the light while repeatedly scattering the light by the particles in the optical medium in addition to the action of total reflection at an interface between a side end surface of the light guide and a surrounding medium (air or cladding layer). Accordingly, in comparison with a light guide which propagates the light only by the action of the total reflection, the light guide thus described has an advantage in that light, the intensity thereof being made more uniform, can be taken out of an emitting end surface. For example, as described in U.S. Pat. No. 5,822,475, it is conceivable that by utilizing this advantage, such a type of light guide applies to the purpose of constituting an optical data bus (sheet bus). The optical data bus is that which is formed by use of a sheet optical medium, and in which one input unit inputting an optical signal is coupled to one end surface thereof, and a plurality of output units are coupled to the other end surface, thus distributing the inputted optical signal as a common signal to the plurality of output units.

Moreover, for example, as described in Japanese Unexamined Patent Publication No. 11(1999)-31035, as such an optical data bus, one has been also known, in which light-scattering portions are provided on a light-incident-side end portion of the sheet optical medium so as to correspond to respective signal light incident portions, and signal light scattered and branched by the light-scattering portions is made to propagate toward a light-emitting-side end portion of the optical medium.

In a communication system using a sheet light guide formed to contain light-scattering particles in the sheet optical medium as described in U.S. Pat. No. 5,822,475, a requirement exists that a received signal be distributed and outputted in parallel to many lines. In order to respond to such a requirement, it is satisfactory if the number of photodetectors coupled to the sheet light guide is increased. However, when the number of nodes is increased, a problem occurs that an S/N ratio of the signal is lowered according to the increase.

SUMMARY OF THE INVENTION

In consideration of the above-described circumstances, it is an object of the present invention to provide a communication system using a sheet light guide, which is capable of ensuring a high S/N ratio of a signal even if the signal is distributed and outputted to many lines.

The communication system using a sheet light guide according to the present invention is characterized in that:

a communication system using a sheet light guide which is formed as described above to contain light-scattering particles in a sheet optical medium and propagates signal light incident from one end surface thereof to the other end surface side while scattering the signal light by the particles, the system including:

a photodetector which is coupled to the other end surface of the sheet light guide and detects the signal light; and a demultiplexer which distributes an output of the photodetector to a plurality of lines.

Note that, in the communication system using the sheet light guide according to the present invention, it is desirable that, when a scattering cross section of the particles is $\Phi$, a length of the optical medium in a light propagation direction is $L_G$, a particle density is Np, and a correction coefficient is $K_C$, a value of $\Phi \cdot Np \cdot L_G \cdot K_C$ be 0.9 or less.

Moreover, in the communication system using the sheet light guide according to the present invention, it is desirable that, when root mean square (rms) noise of the system is Noise(System_rms), an acceptable bit error rate is BER (accept), and a probability of occurrence of the Noise (System_rms) is Pr(Noise(System_rms)), the following be satisfied:

$$Pr(\text{Noise(System\_rms)} \cdot Q) \leq BER(\text{accept})$$

where Q is a proportionality constant.

Furthermore, in the communication system using the sheet light guide according to the present invention, it is desirable that, when rms noise of the system is Noise(System_rms), an arbitrary threshold in binarization is V(Thresh), and a signal voltage outputted from a photodetector through a load resistor is S(PRmin)v, the following be satisfied:

$$\{S(PR\min)v - V(\text{Thresh})\} > \text{Noise(System\_rms)} \cdot Q$$

where Q is a proportionality constant.

Moreover, when it is assumed that, in the sheet light guide for use in the present invention, light incident thereonto repeats reflection on respective surfaces other than incident/emitting end surfaces obeying Snell's Law, and when a refractive index of a surrounding medium is Ns, a refractive index of the optical medium as a matrix is Nm, an incident angle is $\theta m$, and a refraction angle is $\theta s$, if $Nm \cdot \sin \theta m = Ns \cdot \sin \theta s$ is established in the case where the particles are not contained, it is desirable that the sheet light guide be formed of an optical medium with a shape satisfying $\sin \theta s > 1$.

Furthermore, when it is assumed that, in the sheet light guide, a light beam emitted from at least one emitting end surface obeys Snell's Law in reflection/refraction thereof on the emitting end surface, and when a refractive index of a surrounding medium is Ns, a refractive index of the optical medium serving as a matrix is Nm, an incident angle is $\theta m$, and a refraction angle is $\theta s$, if $Nm \cdot \sin \theta m = Ns \cdot \sin \theta s$ is established in the case where the particles are not contained, it is desirable that the sheet light guide be formed of an optical medium with a shape satisfying $\sin \theta s < 1$.

Moreover, in the sheet light guide for use in the present invention, the particles mixed into the optical medium may be non-magnetic conductive particles following the Mie scattering theory. Furthermore, the particles may be mixed into the optical medium with a particle density gradient.

Furthermore, it is also possible to constitute this sheet light guide by combining a plurality of optical media.

In the communication system using the sheet light guide according to the present invention, the demultiplexer which distributes the output of the photodetector coupled to the end surface of the sheet light guide to the plurality of lines is provided. Thus, the distribution of the signal can be electrically performed by the demultiplexer. Accordingly, the number of signals distributed can be set high by combining this electrical distribution and an optical distribution by the sheet light guide. Therefore, it is possible to ensure the high S/N of the signal while reducing the number of nodes set on the sheet light guide.

Note that, in U.S. Pat. Nos. 5,548,670 and 5,542,017 described above, there has been proposed a light guide path for realizing a desired light intensity distribution by use of a structure with a nonuniform refractive index or by mixing/diffusing dielectric particles into the optical medium. Moreover, in these U.S. Pat. Nos. 5,548,670 and 5,572,017, it is described that an application of the Debye turbidity theory (Journal of Applied Physics, Vol. 20, pp. 518–525 (1949)) makes it possible to increase the intensity of the scattering light, and to realize uniformity of the light intensity distribution at an emitting port. Debye refers to Einstein's "Theory on Thermal Fluctuations of Dielectric Constant in Gas or Liquid" (Annalen Der Physik, 33, pp. 1275–1298 (1910), and particularly to a consideration regarding the scattering light. An expression given by Einstein in the above-described paper is as follows:

$$i/Io = (RT/N)\cdot[(\in-1)^2(\in+2)^2/P]\cdot(2\pi/\lambda)^4[V/(4\pi D)^2]\cos^2\theta \quad (1)$$

where i: light intensity at position apart from scatterer by distance D
　Io: intensity of incident light
　R: gas constant
　T: absolute temperature
　N: molecularity of molecules of 1 g
　$\in$: square (dielectric constant) of refractive index for wavelength $\lambda$
　P: pressure applied to fluid
　$\lambda$: wavelength
　V: volume of light scatterer
　D: distance from light scatterer to observation point
　$\theta$: scattering angle The above-described Einstein expression is transformed by Debye, and represented as follows:

$$i/I = <\eta>^2/\in^2 (\pi^2 V/\lambda^4 R^2)\cdot(1+\cos^2\theta)/2 \cdot \omega \quad (2)$$

where i: light intensity at position apart from scatterer by distance D
　Io: intensity of incident light
　$\in$: dielectric constant of scatterer
　$<\eta>^2$: mean square value of fluctuations of dielectric constant of scatterer
　R: distance from observation point to scatterer
　$\lambda$: wavelength
　V: total volume of light scatterer
　$\theta$: scattering angle
　$\omega$: correlation volume Moreover, the following is established:

$$\omega = 4\pi \int \sin(ksr)/ksr \bullet r^2 \gamma(r) dr \quad (3)$$

where k: wave number
　s: length of resultant vector of unit vector of incident light and unit vector of emitted light
　r: distance between two points where fluctuations of dielectric constant occur, and s is equal to $2\sin(\theta/2)$.

According to Debye, the correlation volume $\omega$ can be integrated when the correlation function $\gamma(r)$ is set as follows:

$\gamma(r) = \exp(-r/a)$ ($a$: correlation distance)

Accordingly, expression (3) can be represented as:

$$\omega = 8\pi a^3/(1+k^2 s^2 a^2)^2 \quad (4)$$

From expressions (2) and (4), the following expression is established:

$$i/I = <\eta>^2/\in^2 (\pi^2 V/\lambda^4 R^2)\cdot(1+\cos^2\theta)/2 \cdot 8\pi a^3/(1+k^2 s^2 a^2)^2$$

Here, by use of $s=2\sin(\theta/2)$, expression (2) is transformed as follows:

$$i/I = 4\pi a^{3<\eta>2}/\in^2 (\pi^2 V/\lambda^4 R^2)\cdot(1+\cos^2\theta)/(1+8\pi^2)(1-\cos\theta((a/\lambda)^2)^2 \quad (5)$$

The item for the intensity of the scattering angle in expression (4) is represented as follows:

$$f(\theta) = (1+\cos^2\theta)/(1+8\pi^2(1-\cos\theta)(a/\lambda)^2)^2 \quad (6)$$

FIG. 1 shows the results on finding scattering angles versus normalization intensities by calculating this expression (6) for each value of typical ($a/\lambda$). Moreover, FIG. 2 shows results on finding the scattering angles versus the normalization intensities for each value of typical particle diameters Dp based on the Mie scattering theory.

According to U.S. Pat. Nos. 5,548,670 and 5,542,017, the particle diameter can be conceived to be substantially equal to the correlation distance. Accordingly, it is understood from FIG. 1 that, although intensity of forward-scattering light is increased when the particle diameter is substantially equal in size to the wavelength, intensity of side-scattering light is extremely increased when the particle diameter exceeds ten times the wavelength, so that the light no longer travels forward. Meanwhile, according to the Mie scattering theory, as apparent from FIG. 2, the intensity of the forward-scattering light is still large even if the particle diameter exceeds ten times the wavelength. It is understood that, in the case where the Debye turbidity theory is approximated by $\gamma(r) = \exp(-r/a)$, obtained results are approximate to the results of the Mie scattering when the particle diameter is substantially equal to the wavelength, but that the results are largely shifted from those of the Mie scattering theory for particle diameters larger than the diameter substantially equal to the wavelength.

From the above consideration, the Mie scattering theory is conceived to be more suitable as a calculation method to be used for emitting the incident light with a uniform intensity distribution, by mixing particles causing the light scattering into a desired optical medium. The Mie scattering theory shows Rayleigh scattering when the size of the particles is extremely smaller than the wavelength and shows Huygens-Fresnel diffraction when the size of the particles is extremely larger than the wavelength. Furthermore, the Mie scattering theory is for a single-particle system, and an analysis by means of a multi-particle system based on the Mie scattering theory is conceived to be necessary for scattering of multi-particles.

In manufacture of the sheet light guide for use in the present invention, designing conditions for realizing desired light extraction efficiency can be easily obtained based on the above consideration. A method for the obtainment is described below in detail.

<Scattering Cross Section>

First, a scattering cross section $\Phi$ is described. The concept of the scattering cross section is widely used not only in the Mie scattering theory but also in a region of radiation of such as γ-rays and X-rays and in a region of long wavelength such as infrared rays and microwave besides light in the visible region. When a relationship between the particle diameter and the wavelength is within the Rayleigh range, the scattering cross section $\Phi$ is represented as:

$$\Phi = 128 \cdot \pi^5 \cdot (a_P^6/3\lambda^4) \cdot \{(n^2-1)/(n^2+2)\}^2 \qquad (7)$$

where $a_P$: particle radius
$\lambda$: wavelength of incident light
n: relative refractive index Meanwhile, in the Mie theory, the scattering cross section $\Phi$ is represented in the following expression (8):

$$\Phi = (\lambda^2/2\pi) \sum_{n=1}^{\infty} (2n+1) \cdot [|a_n|^2 + |b_n|^2] \qquad (8)$$

where $\lambda$: wavelength of incident light $$a_n = \frac{\varphi n(\alpha) \cdot \varphi' n(\beta) - N \cdot \varphi n(\beta) \cdot \varphi' n(\alpha)}{\zeta n(\alpha) \cdot \varphi' n(\beta) - N \cdot \varphi n(\beta) \cdot \zeta' n(\alpha)}$$

$$bn = \frac{N \cdot \varphi n(\alpha) \cdot \varphi' n(\beta) - \varphi n(\beta) \cdot \varphi' n(\alpha)}{N \cdot \zeta n(\alpha) \cdot \varphi' n(\beta) - \varphi n(\beta) \cdot \zeta' n(\alpha)}$$

$$\varphi n(kr) = (\pi kr/2) \cdot J_{n+1/2}(kr)$$

where $J_{n+1/2}$ (kr): Bessel function of the first kind
k: wave number ($2\pi/\lambda$)
r: distance component in polar coordinates
$\varphi n'$: derivative of $\varphi n$ $\zeta n(kr) = \varphi n(kr) + i \chi n(kr)$ $\chi n(kr) = -(\pi kr/2) \cdot N_{n+1/2}(kr)$ where $N_{n+1/2}$ (kr): Bessel function of the second kind (Neumann function)
$\zeta n'$: derivative of $\zeta n$
$\alpha = 2\pi a/\lambda$
$\beta = N \cdot \alpha$ In a limit of $a/\lambda \gg 1$ of the above-described expression (8), the scattering cross section $\Phi$ is represented as:

$$\Phi = M\pi a_P^2 \quad (M \approx 2 \text{ when converging}) \qquad (9)$$

Moreover, it is already understood from expression (8) that the above-described M oscillates within the range of: $1 < M < 6$ in a region of $2\pi a_P/\lambda \approx 1$.

Here, state of the oscillations of M when the respective relative refractive indices n are 1.1, 1.5 and 2.1 is shown in FIGS. 3A, 3B and 3C, respectively. From these graphs, it is understood that the scattering cross section $\Phi$ in the Mie scattering region comes to oscillate/converge owing to an increase of the particle diameter Dp. In this oscillation region also, it is possible to obtain, in a wide range where the relative refractive index n is approximately 1 to 2, a value for multiplication of the geometric scattering cross section $\pi a_P^2$ in which the Mie scattering region converges, in response to the respective particle diameters from FIGS. 3A to 3C.

Results of obtaining a relationship between the particle diameter Dp and the scattering cross section $\Phi$ based on the above-described expressions (7) and (9) for each of some relative refractive indices n are shown in FIG. 4. Meanwhile, results of obtaining a relationship between the particle diameter Dp of the multi-particle system and an inverse of a particle density to which a certain value is multiplied, based on the Mie scattering theory by means of computer simulation, are shown in FIG. 5.

Note that such computer simulation is performed on the assumption that light having a certain limited scattering angle is made incident onto optical media having cubic shapes with a variety of sizes from 10 mm cube to 1000 mm cube, which contain particles therein. Specifically, the incident light and the size of the cube change similarly to each other. Moreover, the particle diameter Dp is changed within a wide range from the Rayleigh scattering range to the Fresnel diffraction range. Moreover, in the computer simulation for the relationship, it is assumed that the light is emitted from a position opposite with an incident side in the same direction as the incident light, and that light extraction efficiency at light-emitting ends of the cubes is approximately 80%.

From FIGS. 4 and 5, it is understood that there is an intimate relationship between the scattering cross section and the number of particles in the optical medium with the limited size.

<Lambert-Beer Law and Scattering Cross Section>

Following the Lambert-Beer law, transmissivity T where a parallel beam is made incident onto an isotropic medium is represented as:

$$T = I/Io = \exp(-\rho \cdot x) \qquad (10)$$

where x: distance
Io: intensity of incident light
I: intensity of emitted light
$\rho$: attenuation constant When the scattering cross section of the particles is $\Phi$, and the number of particles per unit volume, which are contained in the medium, is Np, the above-described attenuation constant $\rho$ is conceived to be:

$$\rho = \Phi \cdot Np \cdot Kc \qquad (11)$$

Here, $K_C$ is a dimensionless correction coefficient empirically obtained when the light propagates through the optical medium of the limited space.

Moreover, parameters generally required in designing the light guide are the volume V of the optical medium, the number of mixed particles $N_{PT}$ and the particle diameter Dp, and how the intensity of the emitted light is changed in this case is examined.

Here, $Np = N_{PT}/V$. Furthermore, $K_C$ is determined from comparison/analogy of FIGS. 4 and 5 and some data (not shown). In this calculation, Kc=0.004 was obtained from FIG. 4, FIG. 5 and some data (not shown). The particle diameter Dp and the scattering cross section $\Phi$ are associated with each other by expressions (7) and (9). Therefore, when the length of the optical medium in the optical axis direction is $L_G$, the light extraction efficiency Eout is given by:

$$Eout = \exp\{-(\Phi \cdot Np \cdot L_G \cdot K_C)\} \qquad (13)$$

From this expression (13), it is understood that the extraction efficiency can be made constant when $\Phi \cdot Np \cdot L_G$ is set equal to CONST. Specifically, it is satisfactory if Np is changed in response to the length $L_G$ of the optical medium in the optical axis direction.

Furthermore, in the case where no particles are present, when being represented by a loss coefficient $K_L$ obtained by synthesizing the shape of the cube, an intensity distribution of the incident light, a Fresnel loss depending on an incident angle, internal transmissivity and the like, the above-described expression (13) is transformed to:

$$E\text{out}=\exp\{-(\Phi \cdot Np \cdot L_G \cdot K_C)\} \cdot K_L \qquad (14)$$

Specifically, the extraction efficiency Eout can be determined by the scattering cross section $\Phi$ of the particles, the particle density Np, the length $L_G$ of the optical medium in the light propagation direction, the correction coefficient $K_C$ and the loss coefficient $K_L$. In other words, when desired light extraction efficiency Eout is given, the light extraction efficiency Eout is realized if the above-described expression (14) is satisfied.

<Fresnel Loss Factor>

With regard to the Fresnel loss, reflectivity is first considered. When a p-polarization component is Rp, and an s-polarization component is Rs, both are represented as:

$$Rp=\tan(\theta i-\theta r)/\tan(\theta i+\theta r) \qquad (15a)$$

$$Rs=-\sin(\theta i-\theta r)/\sin(\theta i+\theta r) \qquad (15b)$$

where $\theta i$: incident angle
$\theta r$: refraction angle

Therefore, intensity Ir of reflected light is obtained from expressions (15a) and (15b) as:

$$Ir=(Rp^2+Rs^2)/2 \qquad (16)$$

From this expression (16), transmitted light intensity It is obtained as:

$$It=1-Ir \qquad (17)$$

When transmitted light intensity considering the intensity distribution of the incident light is It', expression (17) is transformed to:

$$It'(\theta i)=It(\theta i) \cdot D(\theta i) \qquad (18)$$

where $D(\theta i)$: intensity distribution function

<Calculation of Fresnel Loss>

When a beam having an arbitrary scattering angle is incident onto the optical medium, the Fresnel loss is changed in relation to the arbitrary incident angle $\theta i$. When the maximum incident angle of the beam is $\theta \max$, the Fresnel loss at the interfaces is represented as:

$$\int_0^{\theta \max} It(\theta i) \cdot D(\theta i) d\theta i \bigg/ \int_0^{\theta \max} D(\theta i) d\theta i \qquad (19)$$

Here, when it is assumed that the intensity distribution of the incident light has a rectangular shape for the purpose of simplifying the calculation, the above expression (19) is transformed to:

$$\int_0^{\theta \max} It(\theta i) d\theta i \bigg/ \int_0^{\theta \max} d\theta i \qquad (20)$$

Results of obtaining the Fresnel losses for the variety of refractive indices of the optical medium based on this expression (20) are shown in FIG. 6. Note that, in FIG. 6, the losses are shown by plotting the transmissivity along an axis of ordinates. Specifically, transmissivity of 1 corresponds to a loss of 0.

<Calculation of Light Extraction Efficiency, Including Fresnel Loss>

From above FIG. 6, it is understood that, in the case where the incident angle is 30° or less, even if the refractive index of the optical medium and the refractive index of the surrounding medium largely differ from each other, the Fresnel losses of both become substantially the same. Now, in the case where the optical medium is a sheet cuboid, it is conceived that a direction cosine of a light beam in the reflection/refraction is conserved, and that the incident angle and the emitting angle become the same when no particles are present. Moreover, the product of the transmissivity of the incident surface and the transmissivity of the emitting surface becomes total transmissivity Ttotal when the transmissivities can be approximated to the internal transmissivity Tin≈1. Accordingly, when the refractive index of the optical medium is set as: n=1.5, Ttotal becomes equal to 0.92.

Therefore, expression (14) is transformed to:

$$E\text{out}=\exp\{-(\Phi \cdot Np \cdot L_G \cdot K_C)\} \cdot 0.92 \qquad (14b)$$

Results of obtaining a relationship between the particle diameter and the light extraction efficiency by means of this expression (14b) are shown in FIGS. 7A to 7E. Note that, when the intensity of the incident light has some distribution, or when the incident angle of the incident light is 30° or more, it is satisfactory if the Fresnel loss is obtained by expression (19) or expression (20) and assigned to expression (14b). However, it is desirable to set the scattering of the incident light at approximately 30° by a half angle in consideration of a critical angle at the time of emission.

Above-described FIGS. 7A to 7E show, in the calculation method, for light extraction efficiencies as average targets of the respective particle diameters, which are first determined, calculated values (10 mmC, 100 mmC and 1000 mmC) in the respective particle diameters and results of a precise simulation (S 10 mm, S 100 mm and S 1000 mm) by the particle diameters and the particle densities for use in this calculation. The light extraction efficiencies as the average targets are 80%, 70%, 60%, 50% and 40% in FIGS. 7A, 7B, 7C, 7D and 7E, respectively. The scattering cross section $\Phi$ is obtained according to the Rayleigh theory when the particle diameter is 20 nm, and according to the Mie theory when the particle diameter is 200 nm or more. Reference symbol S denotes the results of the simulation, and reference symbol C denotes the results of this calculation. Moreover, numeric values represent the lengths $L_G$ of the optical medium in the light propagation direction.

According to FIGS. 7A to 7E, it is understood that, when the light extraction efficiencies as the average targets are 60% or more, errors from the results of the precise simulation remain within a range of less than 10%, and that both coincide with each other. Specifically, in other words, FIGS. 7A to 7E show that the errors remain within the range of less than 10% when the value of $\Phi Np \cdot L_G \cdot K_C$ is 0.4 or less. Moreover, FIGS. 7A to 7E simultaneously show that the errors remain within a range of less than 50% even if the above-described value is 0.9 or less. Note that 0.92, which is an empirically obtained value, is used as the value of $K_L$.

In terms of simulation and trial manufacture, it is conceived that no particular problem occurs for the purpose of setting the targets for the light extraction efficiencies even if errors of approximately 50% occur. Needless to say, it is not necessary to perform the simulation when the errors are less than 10%. Moreover, it becomes unnecessary to evaluate several kinds of samples and draw candidates therefrom. Accordingly, an effect that development efficiency is improved is obtained.

From the results described above, it is conceivable that it is possible to obtain a good solution for the light extraction efficiency by use of expression (14) based on the results of the Rayleigh region and the Mie scattering convergent region, which are relatively simple, without relying on the complicated theory of the Mie scattering. This method is that which has been created in consideration of this finding. As described above, the desired light extraction efficiency Eout is realized by satisfying the following expression:

$$Eout = \exp\{-(\Phi \cdot Np \cdot L_G \cdot K_C)\} \cdot K_L$$

<Calculation Example>

Results of performing the calculation for the sheet cuboid based on expression (14) are shown in Tables 1 to 3 and FIGS. 8A to 8C. Note that it is FIG. 8A that shows numeric values of Table 1 in a graph, and in a similar manner, Table 2 and Table 3 correspond to FIG. 8B and FIG. 8C, respectively. In the calculation results in these Tables, any of the values of $\Phi \cdot Np \cdot L_G \cdot K_C$ is 0.9 or less. Note that, in all of the cases, the value of $K_L$ is 0.92.

TABLE 1

Eout = 0.8

| Particle diameter (nm) | Scattering cross section (m²) | Particle density (pieces/mm³) | W × T × L$_G$ (mm) | Extraction efficiency, expression (14) (%) | Extraction efficiency, SIM (%) |
|---|---|---|---|---|---|
| 20 | $1.1 \times 10^{-22}$ | $1.0 \times 10^{13}$ | 4 × 1 × 20 | 84 | 87 |
|  |  | $2.5 \times 10^{12}$ | 16 × 1 × 80 |  | 88 |
|  |  | $6.3 \times 10^{11}$ | 64 × 1 × 320 |  | 88 |
| 200 | $1.5 \times 10^{-14}$ | $3.0 \times 10^{7}$ | 4 × 1 × 20 | 89 | 89 |
|  |  | $7.5 \times 10^{8}$ | 16 × 1 × 80 |  | 89 |
|  |  | $1.9 \times 10^{8}$ | 64 × 1 × 320 |  | 89 |
| 2000 | $12.6 \times 10^{-12}$ | $3.0 \times 10^{5}$ | 4 × 1 × 20 | 68 | 75 |
|  |  | $7.5 \times 10^{4}$ | 16 × 1 × 80 |  | 76 |
|  |  | $1.9 \times 10^{4}$ | 64 × 1 × 320 |  | 76 |
| 20000 | $6.3 \times 10^{-10}$ | $3.0 \times 10^{3}$ | 4 × 1 × 20 | 79 | 86 |
|  |  | $7.5 \times 10^{2}$ | 16 × 1 × 80 |  | 86 |
|  |  | $1.9 \times 10^{2}$ | 64 × 1 × 320 |  | 86 |
| 200000 | $6.3 \times 10^{-8}$ | $3.0 \times 10^{1}$ | 4 × 1 × 20 | 79 | 90 |
|  |  | $7.5 \times 10^{0}$ | 16 × 1 × 80 |  | 90 |
|  |  | $1.9 \times 10^{0}$ | 64 × 1 × 320 |  | 90 |
|  |  | Cuboid (Sheet) |  |  |  |

Note)
SIM: simulation

TABLE 2

Eout = 0.7

| Particle diameter (nm) | Scattering cross section (m²) | Particle density (pieces/mm³) | W × T × L$_G$ (mm) | Extraction efficiency, expression (14) (%) | Extraction efficiency, SIM (%) |
|---|---|---|---|---|---|
| 20 | $1.1 \times 10^{-22}$ | $2.0 \times 10^{13}$ | 4 × 1 × 20 | 78 | 82 |
|  |  | $5.0 \times 10^{13}$ | 16 × 1 × 80 |  | 83 |
|  |  | $1.3 \times 10^{12}$ | 64 × 1 × 320 |  | 83 |
| 200 | $1.5 \times 10^{-14}$ | $6.0 \times 10^{7}$ | 4 × 1 × 20 | 85 | 85 |
|  |  | $1.5 \times 10^{7}$ | 16 × 1 × 80 |  | 85 |
|  |  | $3.8 \times 10^{6}$ | 64 × 1 × 320 |  | 84 |
| 2000 | $12.6 \times 10^{-12}$ | $4.5 \times 10^{5}$ | 4 × 1 × 20 | 59 | 65 |
|  |  | $1.1 \times 10^{5}$ | 16 × 1 × 80 |  | 65 |
|  |  | $2.8 \times 10^{4}$ | 64 × 1 × 320 |  | 58 |
| 20000 | $6.3 \times 10^{-10}$ | $4.5 \times 10^{3}$ | 4 × 1 × 20 | 73 | 79 |
|  |  | $1.1 \times 10^{3}$ | 16 × 1 × 80 |  | 79 |
|  |  | $2.8 \times 10^{2}$ | 64 × 1 × 320 |  | 70 |
| 200000 | $6.3 \times 10^{-8}$ | $4.5 \times 10^{1}$ | 4 × 1 × 20 | 73 | 86 |
|  |  | $1.1 \times 10^{1}$ | 16 × 1 × 80 |  | 86 |
|  |  | $2.8 \times 10^{0}$ | 64 × 1 × 320 |  | 78 |
|  |  | Cuboid (Sheet) |  |  |  |

Note)
SIM: simulation

TABLE 3

Eout = 0.6

| Particle diameter (nm) | Scattering cross section ($m^2$) | Particle density (pieces/$mm^3$) | W × T × $L_G$ (mm) | Extraction efficiency, expression (14) (%) | Extraction efficiency, SIM (%) |
|---|---|---|---|---|---|
| 20 | $1.1 \times 10^{-22}$ | $3.2 \times 10^{13}$ | 4 × 1 × 20 | 70 | 78 |
|  |  | $8.0 \times 10^{12}$ | 16 × 1 × 80 |  | 79 |
|  |  | $2.0 \times 10^{12}$ | 64 × 1 × 320 |  | 79 |
| 200 | $1.5 \times 10^{-14}$ | $1.2 \times 10^{8}$ | 4 × 1 × 20 | 79 | 78 |
|  |  | $3.0 \times 10^{7}$ | 16 × 1 × 80 |  | 78 |
|  |  | $7.5 \times 10^{6}$ | 64 × 1 × 320 |  | 77 |
| 2000 | $12.6 \times 10^{-12}$ | $9.0 \times 10^{5}$ | 4 × 1 × 20 | 37 | 41 |
|  |  | $2.3 \times 10^{5}$ | 16 × 1 × 80 |  | 40 |
|  |  | $5.6 \times 10^{4}$ | 64 × 1 × 320 |  | 36 |
| 20000 | $6.3 \times 10^{-10}$ | $9.0 \times 10^{3}$ | 4 × 1 × 20 | 59 | 60 |
|  |  | $2.3 \times 10^{3}$ | 16 × 1 × 80 |  | 60 |
|  |  | $5.6 \times 10^{2}$ | 64 × 1 × 320 |  | 52 |
| 200000 | $6.3 \times 10^{-8}$ | $9.0 \times 10^{1}$ | 4 × 1 × 20 | 59 | 73 |
|  |  | $2.3 \times 10^{1}$ | 16 × 1 × 80 |  | 73 |
|  |  | $5.6 \times 10^{0}$ | 64 × 1 × 320 |  | 64 |
|  |  | Cuboid (Sheet) |  |  |  |

Note)
SIM: simulation

In FIGS. 8A to 8C, lines denoted by reference symbols (C) and (S) represent the results of this calculation and results of the precise simulation, respectively. Moreover, numeric values represent dimensions (mm) of the optical media. Furthermore, the light extraction efficiencies as the targets are set at the averages in the respective particle diameters. As apparent from Tables 1 to 3 and FIGS. 8A to 8C, it is understood that the results of this calculation and the results of the simulation coincide with each other. In particular, the results for the case in which the particle diameter is 2000 nm make it far more apparent that this calculation method coincides with the simulation.

<Distribution Characteristics of Emitted Light Intensity>

Distribution characteristics of emitted light intensity are affected by an intensity distribution of light source, a scattering angle thereof, the number and location of the light source and the like, and were accordingly evaluated by the simulation. The distribution characteristics of the emitted light intensity for each particle diameter, which were thus obtained, are shown in FIGS. 9A, 9B and 9C. Here, it is assumed that the light source is located at a center of an incident-side cross section of the optical medium, and the scattering angle is set at 30° by a half angle. FIGS. 9A, 9B and 9C show results of performing the simulation for the case of the sheet cuboids under the same conditions as in Table 1, and show the results of the cases where sheet sizes thereof are small, medium and large, respectively.

From these graphs, it is understood that substantially uniform intensity distributions are realized at approximately 90% of the light extraction efficiency in the optical media of which cross sections are rectangular. From the above consideration and the computer simulation, when the light guide is manufactured by mixing the particles generating the light scattering into an arbitrary optical medium, first, based on expression (14), the light extraction efficiency can be drawn in advance based on the scattering cross section, the particle density, the dimension of the optical medium and the like according to each particle diameter. Furthermore, the distribution characteristics of optical intensity may be obtained by the precise simulation. Alternatively, it is also possible to make several kinds of samples according to the conditions drawn in advance from expression (14), and to experimentally evaluate the samples.

Moreover, if the sheet light guide for use in the present invention is configured to satisfy the relationship of: $\Phi \cdot Np \cdot L_G \cdot K_C \leq 0$ as described above, then the errors from the results of the simulation remain within the range of less than 10%. Therefore, good light extraction efficiency and an uniform intensity distribution of the emitted light can be realized.

Moreover, the sheet light guide for use in the present invention is that which propagates light therethrough while repeatedly scattering the light by the particles in the optical medium. Accordingly, both of the followings are possible in a similar way: one is to make the light incident from one end surface and to propagate the light to the other end surface; and the other is to make the light incident from the above-described other end surface and to propagate the light to the above-described one end surface. Accordingly, it becomes possible for a communication system using the sheet light guide of the present invention to perform two-way communication.

<Necessary Condition of Communication System using Sheet Light Guide>

A typical sheet light guide for communication is shown in FIG. 10. As described above, a sheet light guide 10 is formed to contain light-scattering particles in the optical medium such as, for example, polymethylmethacrylate (PMMA), and propagates light incident from one end surface to the other end surface side while scattering the light by the particles. Moreover, a plurality of optical fibers 21, 22 and 23 are connected to the one end surface of the sheet light guide 10, and optical fibers 31, 32 and 33 are connected to the other end surface. To the optical fibers 21 to 23 and 31 to 33, ones with large numerical apertures (N.A.) are usually applied, thus enabling the two-way communication.

Conditions in the case of receiving light by the optical fibers are considered. According to the paper "High-Uniformity Star Coupler Using Diffused Light Transmission" IEICE TRANS. ELECTRON, Vol. E84C, No. 3 MARCH 2001 p. 339, requirements of a photodetector in a sheet light guide system for communication are as follows.

<<As Minimum Received Optical Power of Photodetector, 20.5 dBm (0 dBM=1 mW) or More is Required>>

This is calculated from a Bit-Error-Rate (BER) in the case of transmitting/receiving a signal of 500 Mbps. Moreover, the photodetector is PIN photodiode, and accordingly, this condition is not helpful in the case where different photodetector is used (for example, photomultiplier, avalanche photodiode), or in the case where a transmission band is different. Specifically, in an arbitrary photodetector, the minimum received optical power which is acceptable in a certain transmission band should be present. Thus, the acceptable minimum received optical power of the photodetector, which satisfies the above-described condition, is defined as P(Receiver)min.

First, constraints in the case where the intensity distribution of the emitted light of the sheet light guide is flat are obtained from the above-described condition. Even if the intensity distribution of the emitted light is flat, in one optical fiber, an area ratio $\pi/4$ of the light guide path and the optical fiber cross section necessarily lead to a loss. However, it is assumed that a core diameter of the optical fiber is equal to the thickness of the sheet light guide. Moreover, a tolerance is not considered at present.

When the number of branches (number of nodes) is N, the optical power is lowered to 1/N, and $\pi/4$ of the lowered optical power is counted as a loss. Then, the optical power P(Receiver) received by the photodetector in an ideal case is represented as:

$$P(\text{Receiver}) = E_{out} \cdot (1/N) \cdot \pi/4 \tag{21}$$

Here, it is assumed that the photodetector receives all the emitted light from the optical fiber. Thus, when optical power incident onto the light guide is Pin, expression (21) is transformed to:

$$P(\text{Receiver}) = P_{in} \cdot E_{out} \cdot (1/N) \cdot \pi/4 \tag{22}$$

When a logarithm of this expression (22) is taken, the received optical power of the photodetector, which is represented by dBm, is established as:

$$P(\text{Receiver})_{dBm} = -10\text{Log}\{P_{in} \cdot E_{out} \cdot (1/N) \cdot \pi/4\} \tag{23}$$

A relationship between the received optical power and the number of branches (number of nodes) is shown in FIG. 11 for the cases where the respective incident optical power is 1 mW and 10 mW. As understood from FIG. 11, naturally, the received optical power is proportional to the optical power of emitted light. Moreover, though it is assumed here that the intensity distribution of the light emitted from the sheet light guide is a flat one, in reality, when the position of the light source is changed, the intensity distribution of the emitted light is also changed. Specifically, it is conceived that fluctuations occur in the received optical power, and that the received optical power becomes the minimum at a portion where the intensity of incident light is the minimum.

Here, when the optical power Pin of light incident onto the light guide is given, a distribution profile of the emitted light when the light source is at an arbitrary position is represented by a normalized intensity distribution function D (x, y), in which a direction where the intensity distribution of the emitted light is on a long side is taken as x, and a direction where the intensity distribution thereof is on a short side is taken as y. Moreover, one unit in incident and emitting portions divided by the number of branches (number of nodes) is referred to as a segment, and it is assumed that the center (optical axis) of the optical fiber is ideally positioned at the center of each segment.

Therefore, when Segi is an integration region in an i-th segment, a mean value NPi in which the optical power of emitted light is normalized in the i-th segment is represented as:

$$NPi = \int_{Segi} D(x,y)dxdy \bigg/ \int_{Seg\,max} D(x,y)dxdy \tag{24}$$

Here, Segmax denotes a segment in which the optical power becomes the maximum among all the segments. Moreover, in a segment in which the optical power becomes the minimum, NPi is represented as:

$$NPi(\min) = \int_{Seg\,min} D(x,y)dxdy \bigg/ \int_{Seg\,max} D(x,y)dxdy \tag{25}$$

In expression (23), the entire optical power of emitted light Pout is represented as:

$$P_{out} = P_{in} \cdot E_{out} \tag{26}$$

From this, with regard to the optical power PSegi in the i-th segment, the number of branches, the number of segments and the number of nodes are equal to one another. Accordingly, PSegi is represented as:

$$PSegi = P_{out} \cdot \left\{ NPi \bigg/ \sum_{i=1}^{n} NPi \right\} \tag{27}$$

Note that, in this specification, for the sake of convenience, the following included in the above-described expression (27) is described as $\Sigma NPi$:

$$\sum_{i=1}^{n} NPi$$

The above-described expression (23) and expression (27) are combined, and 1/N in the case where the intensity distribution of the emitted light is flat is replaced by $\Sigma NPi$. Then, the following expression is established:

$$P(\text{Receiver})_{dBm} = -10\text{Log}\{P_{in} \bullet E_{out} \bullet (NPi/\Sigma NPi) \bullet \pi/4\}$$

A value necessary at present is that in the case where the optical power emitted from the optical fiber is the minimum, which is then given by expression (25). Specifically, when $P(\text{Receiver\_min})_{dBm}$ is the minimum optical power received by the photodetector, $P(\text{Receiver\_min})_{dBm}$ is obtained, from the above-described expression, as:

$$P(\text{Receiver\_min})_{dBm} = -10\text{Log}\{P_{in} \bullet E_{out} \bullet (NPi(\min)/\Sigma NPi) \bullet \pi/4\} \tag{28}$$

where Pin: incident optical power

Eout: light extraction efficiency

NPi (min): optical power of segment in which optical power becomes minimum

ΣNPi: sum of optical powers of the segments

Moreover, when the minimum optical power required for the photodetector in order to satisfy a certain BER is $PRmin_{dBm}$, the following relationship is established:

$$PRmin_{dBm} \leq P(Receiver\_min)_{dBm}$$

Furthermore, when a coupling loss of a light emitter and the optical fiber is $K_E$, a coupling loss of the optical fiber and the sheet light guide is $K_F$, a coupling loss of the optical fiber and the photodetector is $K_R$, and an internal loss of the optical fiber $K_{FI}$, $PRmin_{dBm}$ is represented as:

$$PRmin_{dBm} \leq P(Receiver\_min)_{dBm} \cdot K_E \cdot K_F \cdot K_R \cdot K_{FI} \quad (29)$$

This expression (29) becomes the necessary condition for the communication system using the sheet light guide.

<BER (Bit-Error-Rate)>

The BER is an index indicating how much difference occurs between an original digital signal randomly generated and a received digital signal as a result of transmitting the original digital signal through a certain communication medium. When the number of transmitted bits is Bits and the number of bit errors is Biter, the BER is represented as:

$$BER = Biter/Bits \quad (30)$$

Next, a mechanism of the bit error generation is considered. First, a distortion of an analog waveform when an analog signal is converted into a digital signal is mentioned as a first factor. Moreover, the bit error increases when a signal level is lowered, and accordingly, it is also necessary to consider S/N as a factor. Even if the signal level lowers owing to the distortion of the waveform, the bit error should not occur when the signal level stably exceeds a threshold for distinguishing (0, 1) signals. When noise comes flying in from the exterior or occurs in the interior of the system to give a level change to the distorted waveform, such a phenomenon is conceived to become a cause of the bit error (refer to FIG. 12).

The maximum factor in the waveform distortion in the communication system using the sheet light guide is conceived to be a distortion of a received signal itself in which an arbitrary incident segment and an emitted segment correspond to each other, and a waveform distortion owing to a phase shift of each signal component included in a mixing signal corresponding to each incident segment and an arbitrary emitted segment. Moreover, the above-described waveform distortion results from an optical path difference of signal light. Elements causing the optical path difference in the communication system using optical fibers and the sheet light guide are the sheet light guide itself and the optical fibers. Specifically, the bit error is estimated to occur because the signal level falls short of a predetermined threshold due to the waveform distortion when the analog signal is converted into the digital signal. Furthermore, when it is assumed that the digital signal is accompanied by a reference signal (reference clock) when being transmitted, and also that the digital signal is collated with the reference signal also when being read, it is conceived that the bit error occurs when the phase difference (jitter) increases between the reference signal and the digitized signal. Moreover, an analog signal in the vicinity of the threshold fluctuates around the threshold owing to fluctuations by the noise, and is converted into an erroneous digital signal. Specifically, the bit error is conceived to occur because the factor of the optical path difference and the factor of the noise are combined.

<Relationship between Optical Path Difference and Bit-Error-Rate (BER)>

Waveform distortions for the respective numbers of nodes, which are 4, 8 and 16, in the communication systems each using the sheet light guide, are shown in FIGS. 13A and 13B (4 nodes), FIGS. 14A and 14B (8 nodes), and FIGS. 15A and 15B (16 nodes). In these communication systems, an outer diameter of each optical fiber is 1 mm, and a length thereof is 1 m, in which case the optical path difference is negligible. The optical fibers are provided in parallel while being brought into intimate contact with one another both on the light incident side and on the light emitting side.

Moreover, numeric values of "In" and "Out" in each graph represent a light incident position and a light emitting position by distances from a center position of the sheet light guide in the direction where the optical fibers are arrayed. The distances are represented by mm, and positions on a side where the optical fibers onto which the light is made incident are present are denoted by negative symbols (−), and positions on the other side are denoted by positive symbols (+). Specifically, FIG. 13A shows a waveform distortion in the case where the light is made incident onto an optical fiber having a center at a position of −1.5 mm from the above-described center position, that is, the second optical fiber from the center position in the negative direction (optical fiber 21 in the example of FIG. 19 to be described later) and the light is emitted from an optical fiber having a center at the same position (likewise, optical fiber 31). FIG. 13B shows a waveform distortion in the case where the light is made incident onto the optical fiber at the same position as described above (likewise, optical fiber 21) and the light is emitted from an optical fiber having a center at a position of +1.5 mm from the above-described center position, that is, the second optical fiber from the center position in the positive direction (likewise, optical fiber 34). Moreover, FIG. 14A shows a waveform distortion in the case where the light is made incident onto an optical fiber having a center at a position of −3.5 mm from the above-described center position, that is, the fourth optical fiber from the center position in the negative direction and the light is emitted from an optical fiber having a center at the same position. FIG. 14B shows a waveform distortion in the case where the light is made incident onto the optical fiber at the same position as described above and the light is emitted from an optical fiber having a center at a position of +3.5 mm from the above-described center position, that is, the fourth optical fiber from the center position in the positive direction. Furthermore, FIG. 15A shows a waveform distortion in the case where the light is made incident onto an optical fiber having a center at a position of −7.5 mm from the above-described center position, that is, the eighth optical fiber from the center position in the negative direction and the light is emitted from an optical fiber having a center at the same position. FIG. 15B shows a waveform distortion in the case where the light is made incident onto the optical fiber at the same position as described above and the light is emitted from an optical fiber having a center at a position of +7.5 mm from the above-described center position, that is, the eighth optical fiber from the center position in the positive direction.

From these graphs, it is understood that the level change owing to the waveform distortion is negligible in the case that an input signal is 1 Gbps.

<Relationship between S/N and BER>

It is conceivable that an occurrence of erroneous reading (bit error) is also associated with quality of the signal, that is, S/N. Specifically, even if main components from which harmonic components are removed are separated in signal spectra adjacent to one another, if the harmonic components (noise components) are large, signals cannot be distinguished as individual signals. Supposing an extreme case, it is conceivable that it is usually impossible to detect such a signal embedded in noise components unless the signal is particularly subjected to filtering processing.

As the noise component, there is extraneous noise such as radiation noise and induction noise, in addition to noise occurring in the interior of the system, such as thermal noise (Johnson Noise), quantum noise (Shot Noise), 1/f noise intrinsic to a semiconductor device for use in the light emitter and the photodetector. Here, for the purpose of evaluating performance of the system itself, the extraneous noise is ignored, and only the noise occurring in the interior of the system is considered. Moreover, an influence of the 1/f noise is ignored.

Power (Noise(Total)) of the noise components is represented as:

$$\text{Noise(Total)} = \text{Noise(heat)} + \text{Noise(quantum)} \tag{31}$$

When each component is written by the power for a photodetection element:

$$\text{Noise(heat)} = (4kT/R) \cdot \Delta v \tag{31a}$$

where k: Planck's constant
T: equivalent temperature (determined by noise factor)
R: load resistance of photodetector
$\Delta v$: band of photodetector $$\text{Noise(quantum)} = 3e^2 \cdot (P + P_B) \cdot \eta \cdot \Delta v/(hv) + 2ei_d \cdot \Delta v \tag{31b}$$

where e: charge of electrons
P: optical power of signal light
$P_B$: optical power of background light
$\eta$: quantum efficiency
h: Planck's constant
v: frequency of signal light
$i_d$: dark current
$\Delta v$: band of photodetector Here, thought is given to rectifying a signal of the 0.25 GHz band, of which output is not lowered, when a signal of 0.5 Gbps is made. Specifically, the band of the photodiode is 0.25 GHz. In this case, as an example, for a Si photodiode: S5973 made by Hamamatsu Photonics K.K., the noise components are calculated where $P=8.9 \times 10^{-6}$ W (20.5 dBm), $\eta=0.4$, $R=50$ $\Omega$, and $T=300K$. The calculated values converted into current values become:

$$\text{Noise (thermal rms)} = 2.88 \times 10^{-7} (A)$$

$$\text{Noise (quantum rms)} = 8.19 \times 10^{-8} (A)$$

The total noise component becomes:

$$\text{Noise (total rms)} = 3.70 \times 10^{-7} (A) \tag{32}$$

Meanwhile, a signal current Sc in the minimum received optical power is given by:

$$Sc = P \cdot e \cdot \eta/(h \cdot v) \tag{33}$$

Accordingly, a signal current S (min) c at the minimum received optical power becomes:

$$S \text{ (min) } c = 2.46 \times 10^{-6} (A)$$

Therefore, a signal-to-noise ratio (S/N) in this case becomes: S/N(Pmin)=6.65.

Incidentally, the thermal noise is dominant over the distribution of the noise. Accordingly, when the noise distribution is approximated by Gaussian, a probability of occurrence of noise Pr(S/N=1) in the case where the system noise at certain timing becomes 6.65 times the rms noise, that is, in the case where a signal current level becomes equal to a noise current level (S/N=1) becomes:

$$Pr(S/N=1) \approx 3.47 \times 10^{-11}$$

The probability becomes a value approximate to BER≈1× $10^{-11}$, and becomes a value approximate to a probability of occurrence of the BER of the above-described "High-Uniformity Star Coupler Using Diffused Light Transmission" IEICE TRANS. ELECTRON, Vol. E84C, No. 3 MARCH 2001 p. 339. Furthermore, in the case of using a high-pass filter of approximately 20 MHz, which causes no trouble in transmission of the digital signal, the following are obtained:

$$S/N(Pmin) = 6.81$$

$$Pr(S/N=1) \approx 1.31 \times 10^{-11}$$

These substantially coincide with those described in "High-Uniformity Star Coupler Using Diffused Light Transmission" IEICE TRANS. ELECTRON, Vol. E84C, No. 3 MARCH 2001 p. 339. Specifically, the above-described results constitute grounds for considering that the conventional assumption regarding the BER is correct. Note that, in FIG. 16, a relationship between a magnitude of the root mean square (rms) noise and a probability of occurrence thereof is shown.

Furthermore, the assumption regarding the BER is further advanced, and a more practical technique is considered. First, typical rms noise (voltage value) in the communication system using the sheet light guide is measured to be defined as Noise (System_rms). Moreover, when the BER acceptable in the system is defined as BER(accept) and power of a photodetection signal is defined as PRmin, a signal voltage S(PRmin) v is represented as:

$$S(PRmin)v = PRmin \cdot e \cdot \eta/(h \cdot v) \times R \tag{34}$$

where R is a load resistance.

Moreover, a level of the threshold of the (0, 1) signal is defined as V(Thresh), and S/N (Thresh) considering the level of the threshold is defined by:

$$S/N(\text{Thresh}) = \{S(PRmin)v - V(\text{Thresh})\}/\text{Noise(System\_rms)} \tag{35}$$

When expression (35) reaches a certain value, the BE occurs at a certain probability, which is defined as S/Naccept. In this case, from the above-described consideration, it is conceivable that the probability of occurrence of the Noise(System_rms) is equal to the BER. FIG. 17 shows a relationship between the BER calculated based on the above-described consideration and the received optical power. This relationship is very approximate to the result of the actual measurement of "High-Uniformity Star Coupler Using Diffused Light Transmission" IEICE TRANS. ELECTRON, Vol. E84C, No. 3 MARCH 2001 p. 339, and a shape thereof is also very analogous to that thereof.

Considering the V(Thresh), the BE occurs when a value obtained by subtracting the noise component from the signal component is lowered than the V(Thresh) or when a value obtained by adding the noise component to the "0" level exceeds the V(Thresh). Therefore, it is desirable that the V(Thresh) be set at half an average signal voltage.

From the above, in the communication system using the sheet light guide, a communication system configured in the following manner can be defined. When the acceptable BER, that is, BER (accept) is given, and the rms noise of the system is defined as the Noise(System_rms), the probability of occurrence Pr (Noise (System_rms)) of the Noise(System_rms) is Noise(Systme_rms) of a magnitude which satisfies the following in a band where it is not necessary to consider the distortion of the signal waveform:

$$Pr(\text{Noise}(\text{System\_rms}) \cdot Q) \leq \text{BER}(\text{accept}) \tag{36}$$

where Q is a proportionality constant.

When an arbitrary threshold V(Thresh) in binarization is given, the signal level is of the input signal PRmin which satisfies:

$$\{S(P\text{Rmin})v - V(\text{Thresh})\} > \text{Noise}(\text{System\_rms}) \cdot Q \tag{37}$$

Moreover, the signal level is of the signal voltage S (PRmin) v outputted through a load resistor from a photodetector, which satisfies expression (37).

Alternatively, for the above-described reason, the above-described expression (37) can also be defined as:

$$S(P\text{Rmin})v/2 > \text{Noise}(\text{System\_rms}) \cdot Q \tag{38}$$

Furthermore, such a circuit configuration as capable of measuring the BER in the interior of the system is provided, the output power PRmin of the light source is adjusted so as to satisfy the BER(accept), and thus expression (37) and expression (38) may be satisfied. In this case, a digital circuit which makes feedback from the BER measurement circuit to the light source side is provided, and this digital circuit is made as one which controls the optical power of the light source according to a table determined based on the BER (accept). Thus, the digital circuit becomes capable of also coping with the extraneous noise other than the Noise (System_rms) generated by the system itself.

BRIEF DESCRIPTION OF THE DRAWINGS

FIG. 3C is a graph showing a state where the scattering cross section oscillates when the relative refractive index is 2.1 in the Mie theory.

FIG. 7C is a graph showing comparisons of results on a relationship between the particle diameter and light extraction efficiency, obtained by the method of the present invention and by the computer simulation (light extraction efficiency of 60% is targeted).

FIG. 8B is a graph showing the comparisons of results on a relationship between the particle diameter and the light extraction efficiency in a sheet light guide, obtained by the calculation and the simulation (average light extraction efficiency: 70%).

FIG. 12 is an explanatory view explaining a cause of an occurrence of a bit error.

DESCRIPTION OF THE PREFERRED EMBODIMENTS

Embodiments of the present invention will be described below in detail with reference to drawings.

Figure 1:
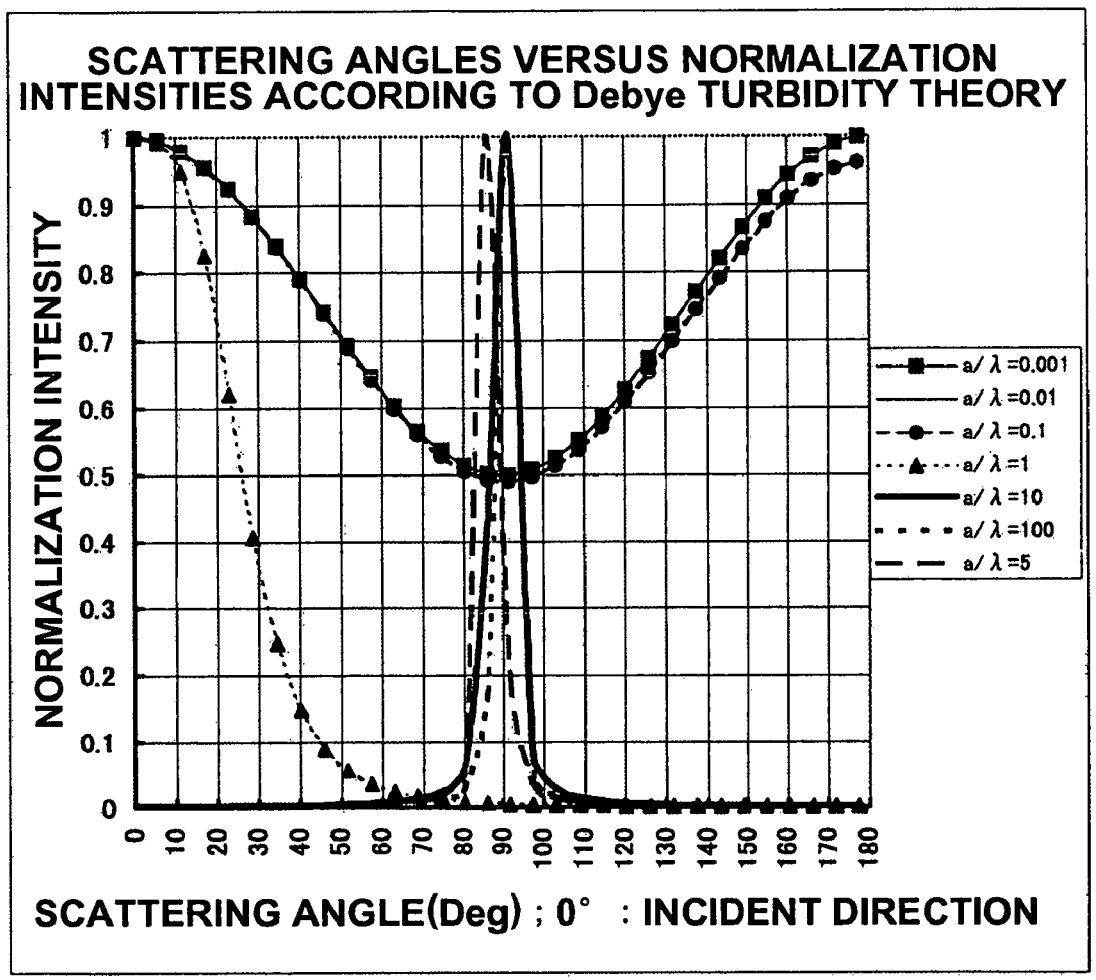
FIG. 1 is a graph showing scattering angles versus normalization intensities following the Debye turbidity theory.
Figure 2:
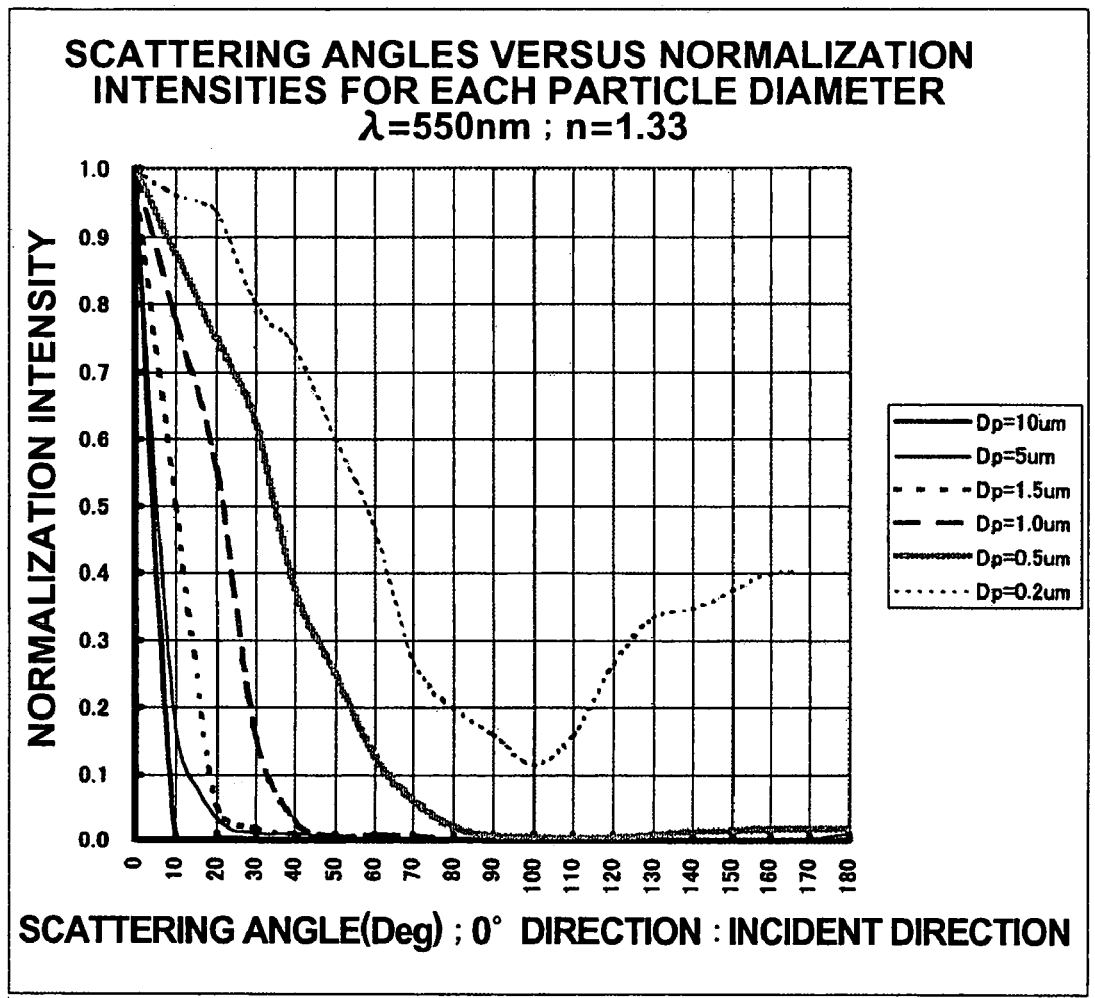
FIG. 2 is a graph showing scattering angles versus normalization intensities following the Mie scattering theory.
Figure 3A:
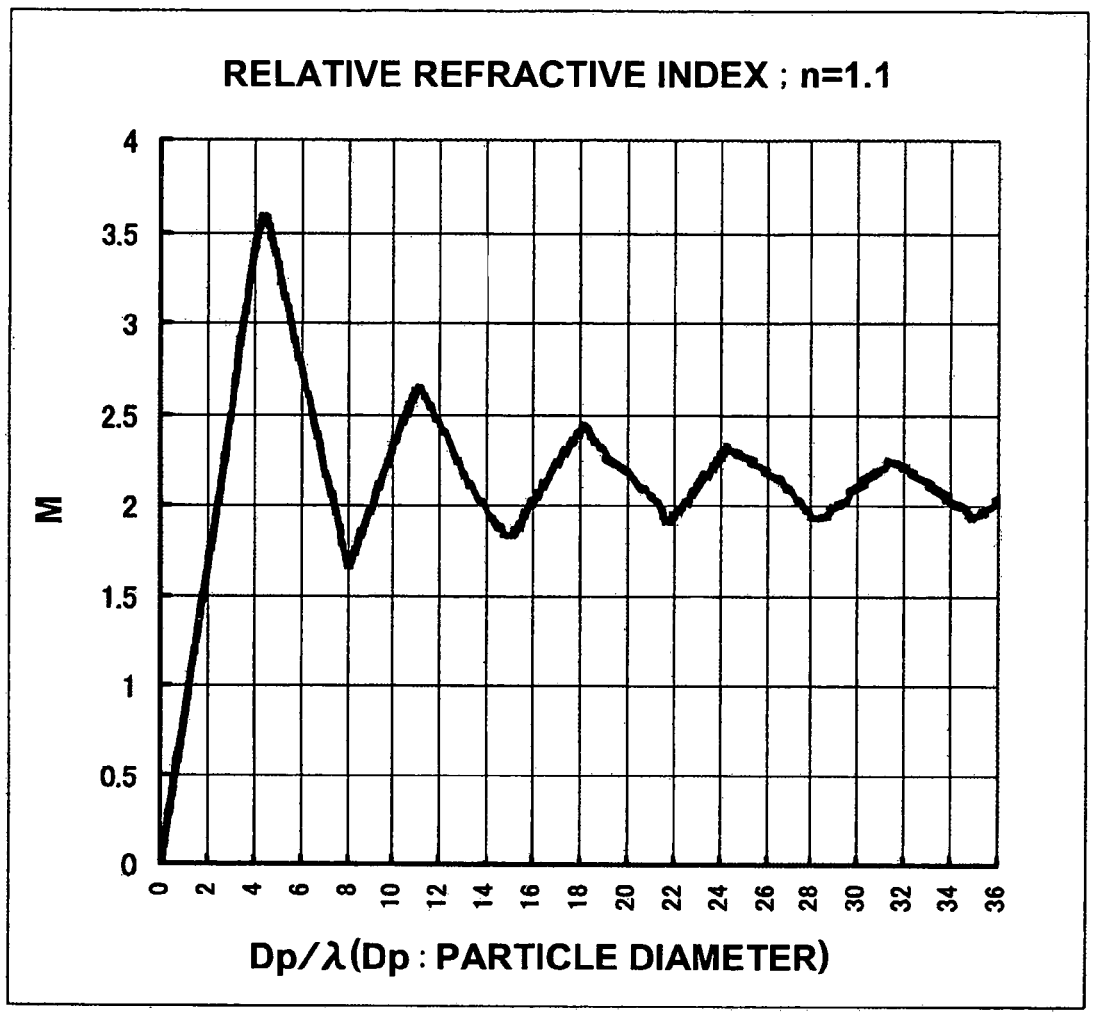
FIG. 3A is a graph showing a state where a scattering cross section oscillates when a relative refractive index is 1.1 in the Mie theory.
Figure 3B:
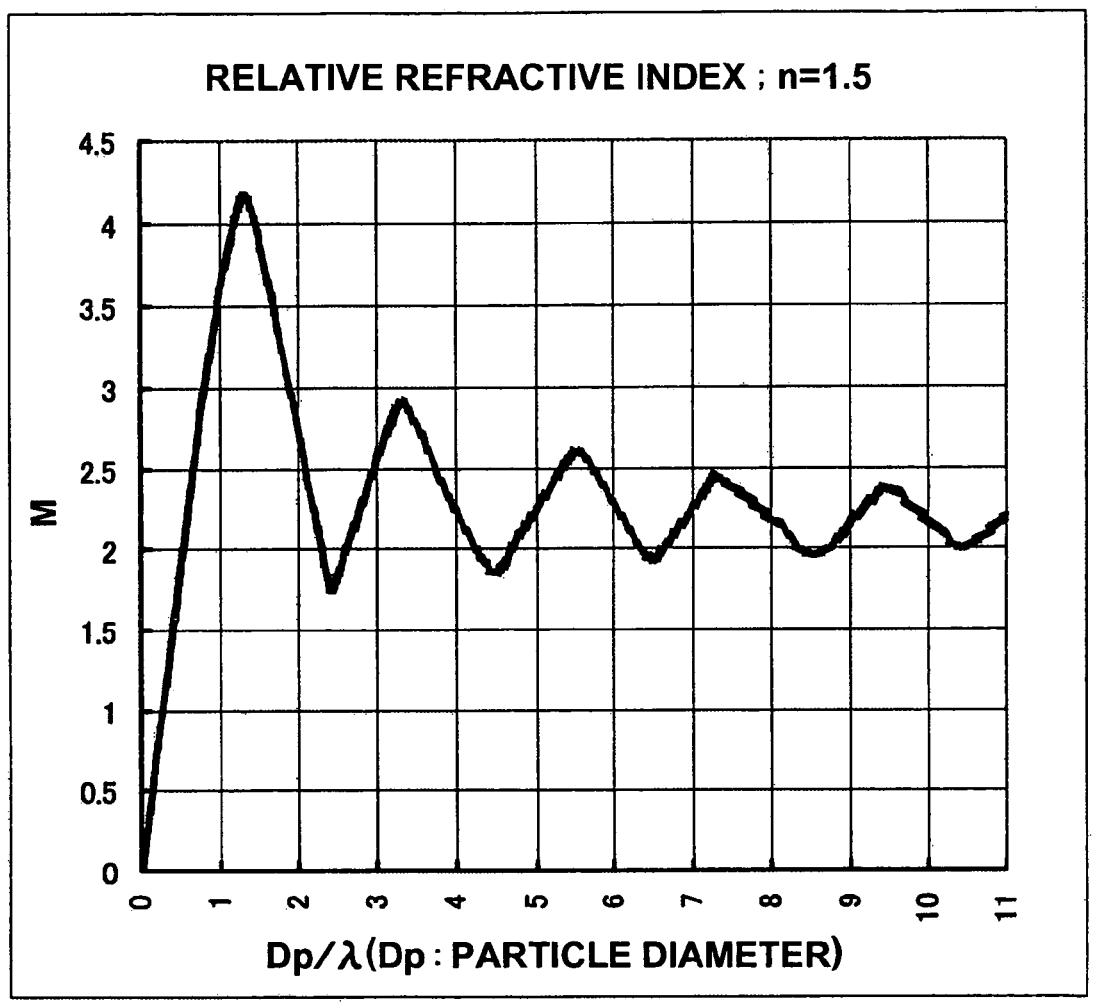
FIG. 3B is a graph showing a state where the scattering cross section oscillates when the relative refractive index is 1.5 in the Mie theory.
Figure 4:
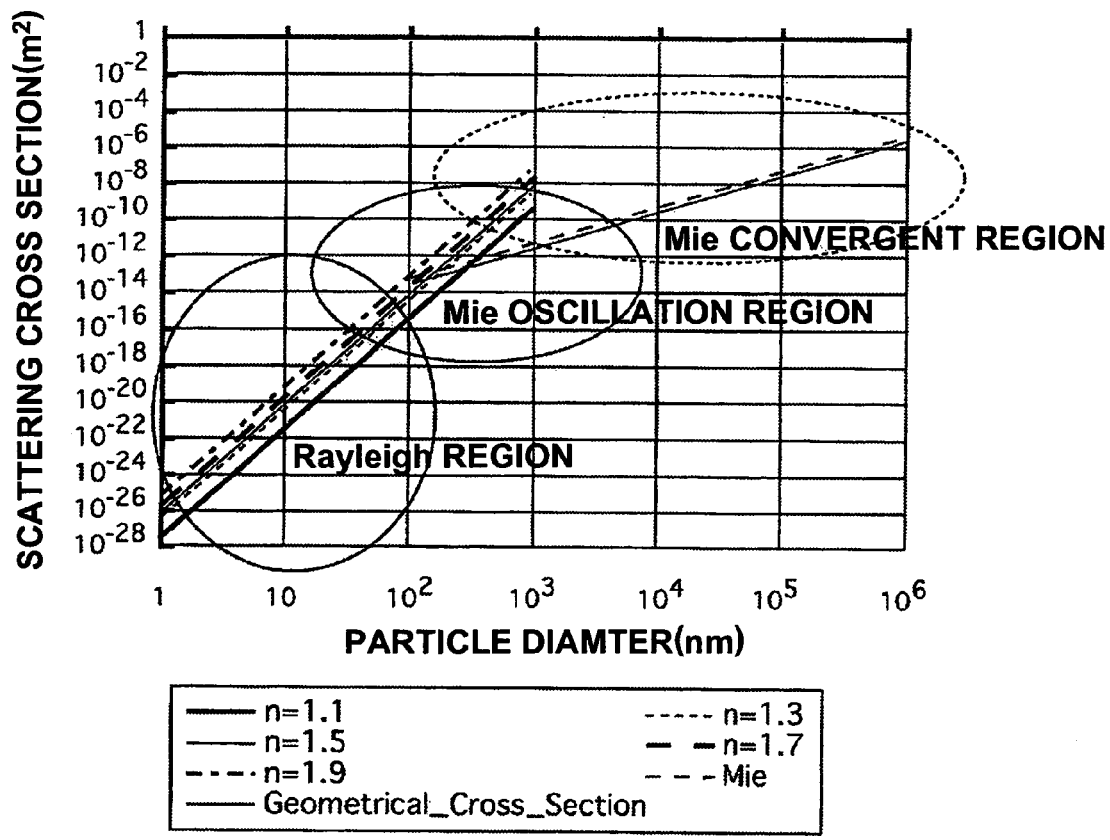
FIG. 4 is a graph showing results on a relationship between a particle diameter and the scattering cross section obtained by computer simulation for each of some relative refractive indices.
Figure 5:
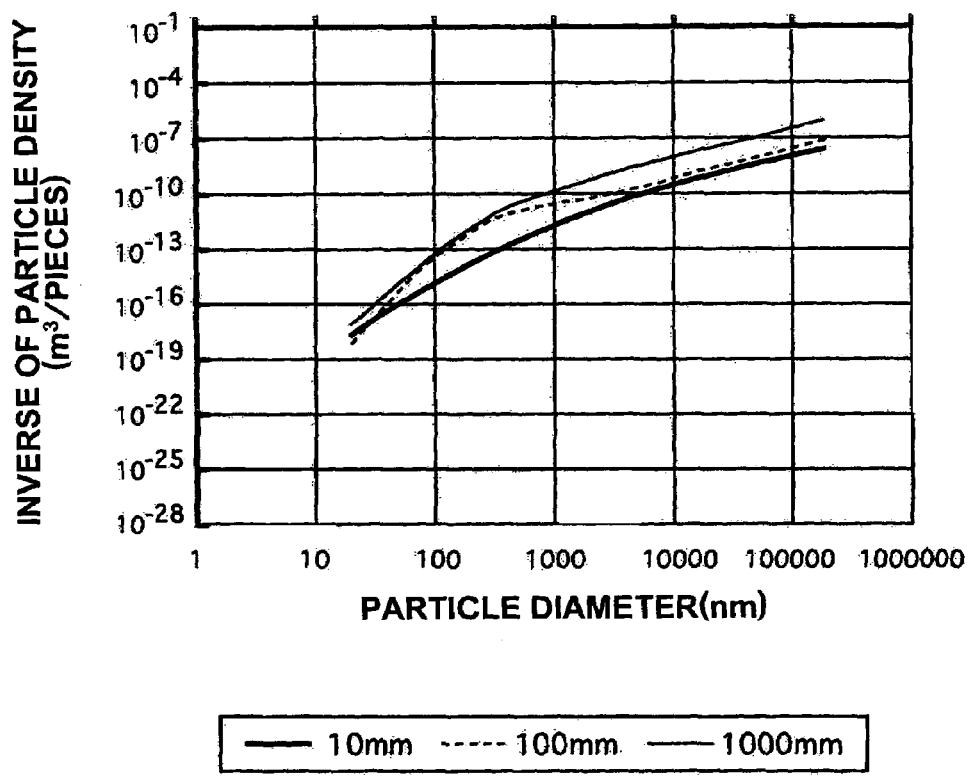
FIG. 5 is a graph showing results on a relationship between a particle diameter of a multi-particle system and an inverse of a particle density obtained by computer simulation.
Figure 6:
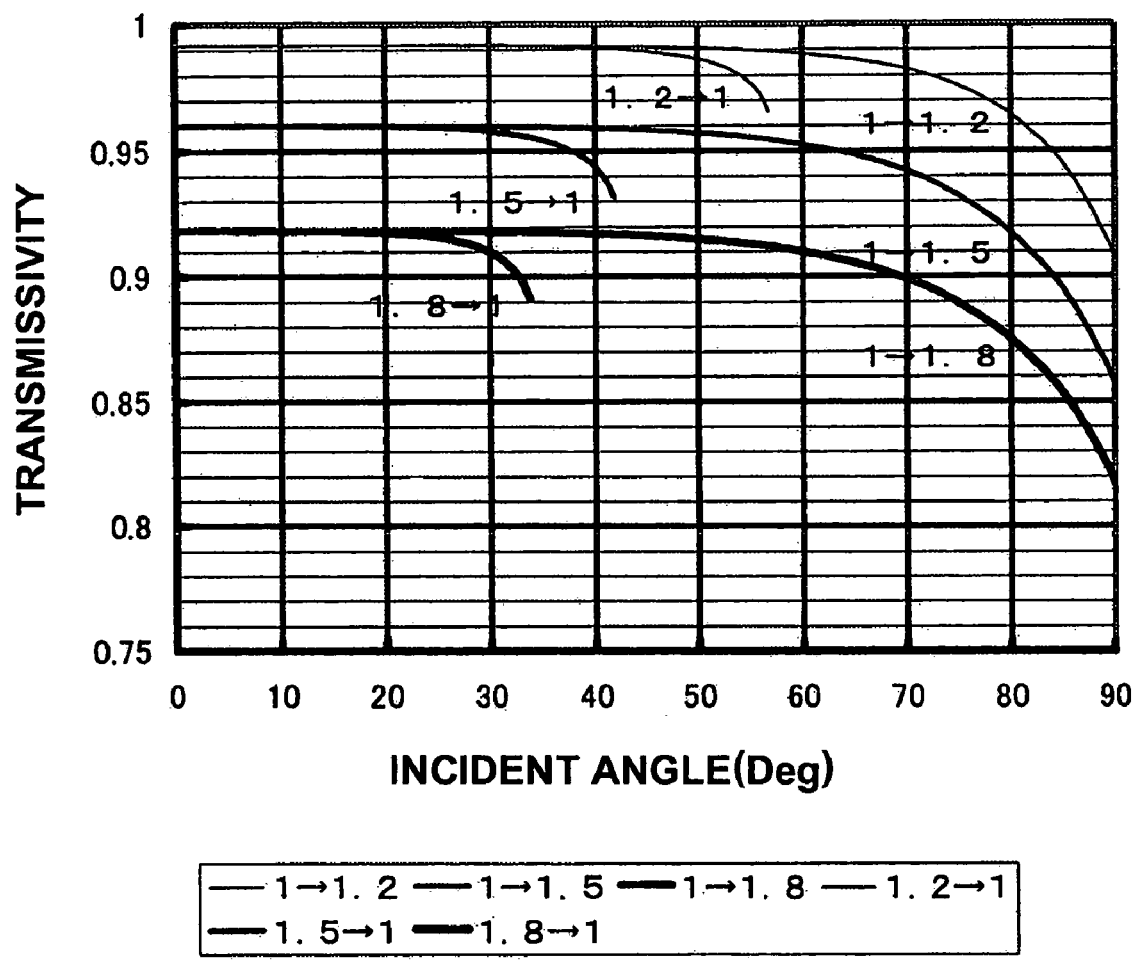
FIG. 6 is a graph showing Fresnel losses for a variety of refractive indices of an optical medium.
Figure 7A:
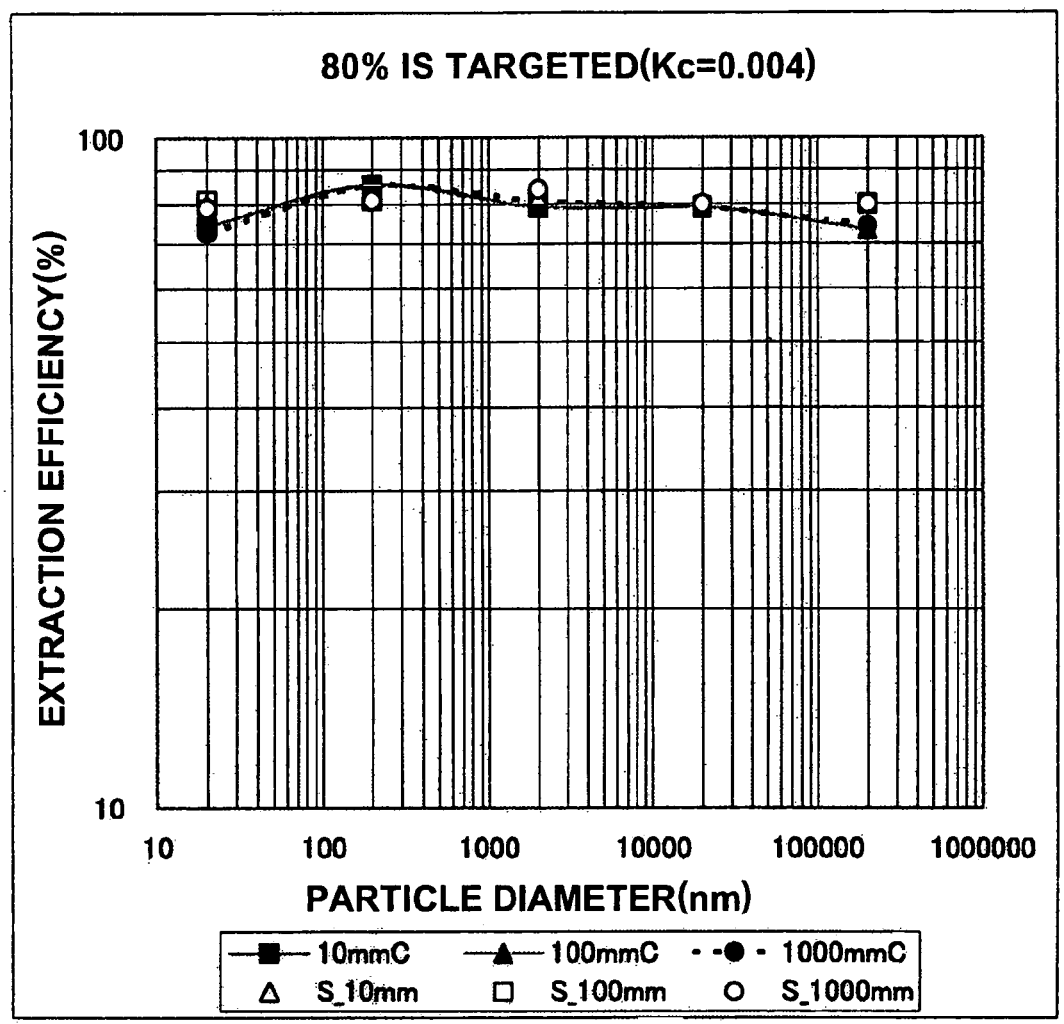
FIG. 7A is a graph showing comparisons of results on a relationship between the particle diameter and light extraction efficiency, obtained by a method of the present invention and by the computer simulation (light extraction efficiency of 80% is targeted).
Figure 7B:
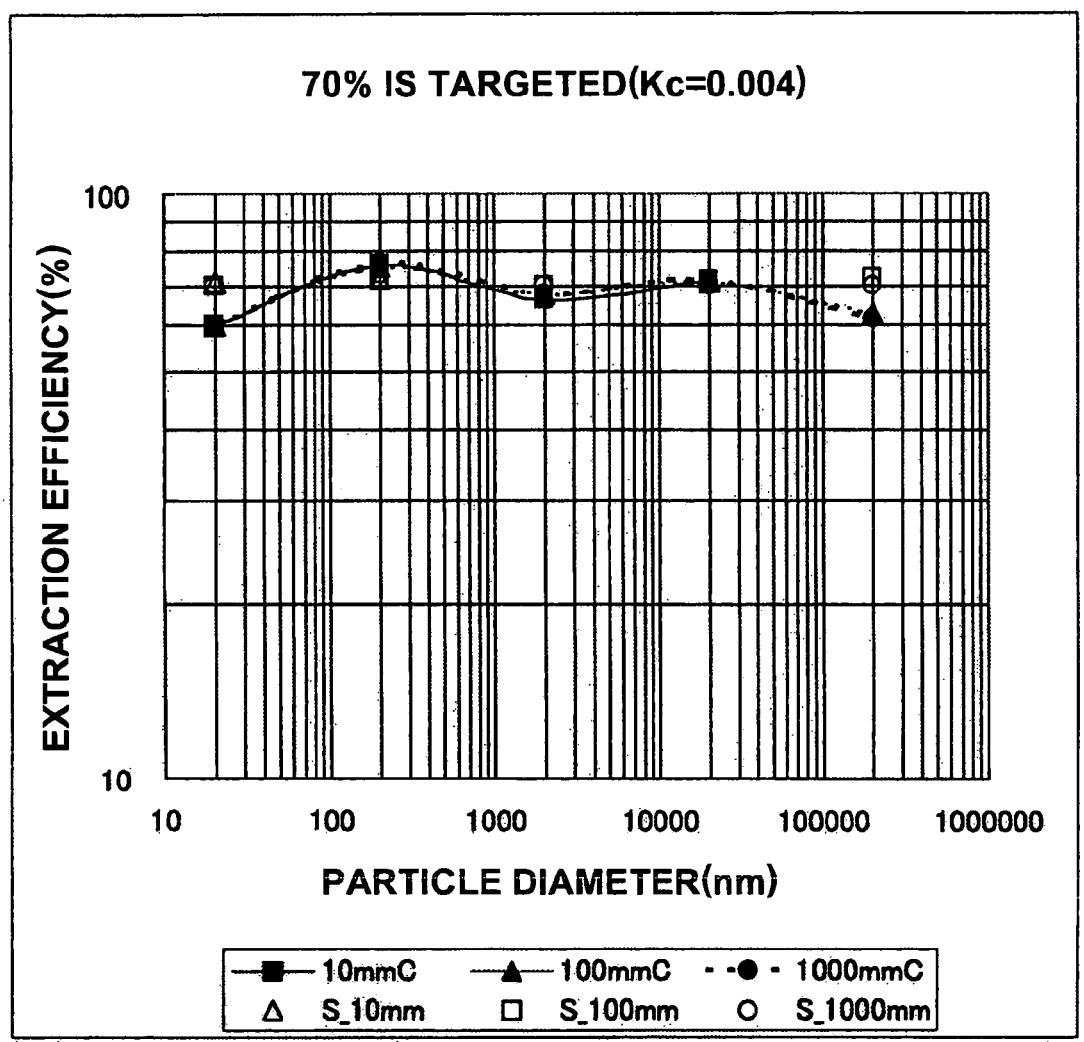
FIG. 7B is a graph showing comparisons of results on a relationship between the particle diameter and light extraction efficiency, obtained by the method of the present invention and by the computer simulation (light extraction efficiency of 70% is targeted).
Figure 7D:
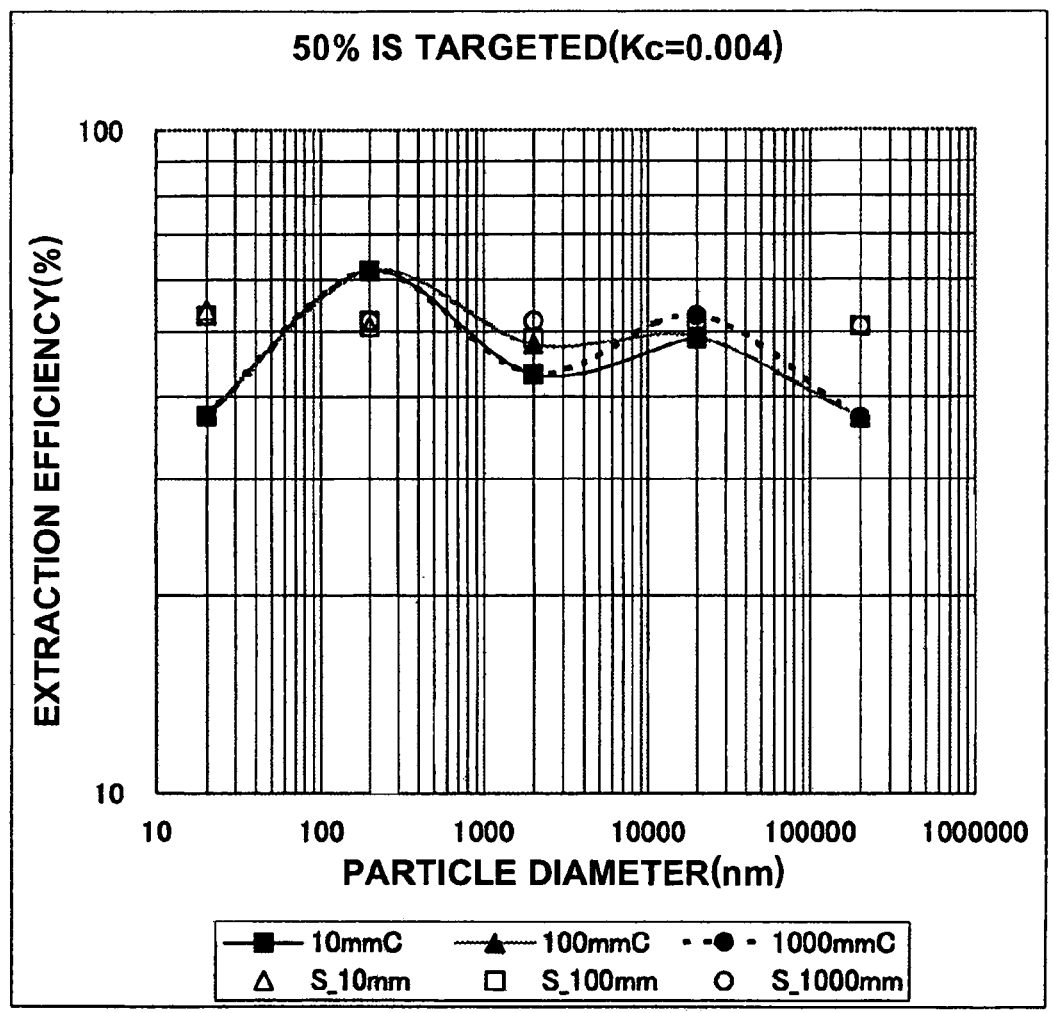
FIG. 7D is a graph showing comparisons of results on a relationship between the particle diameter and light extraction efficiency, obtained by the method of the present invention and by the computer simulation (light extraction efficiency of 50% is targeted).
Figure 7E:
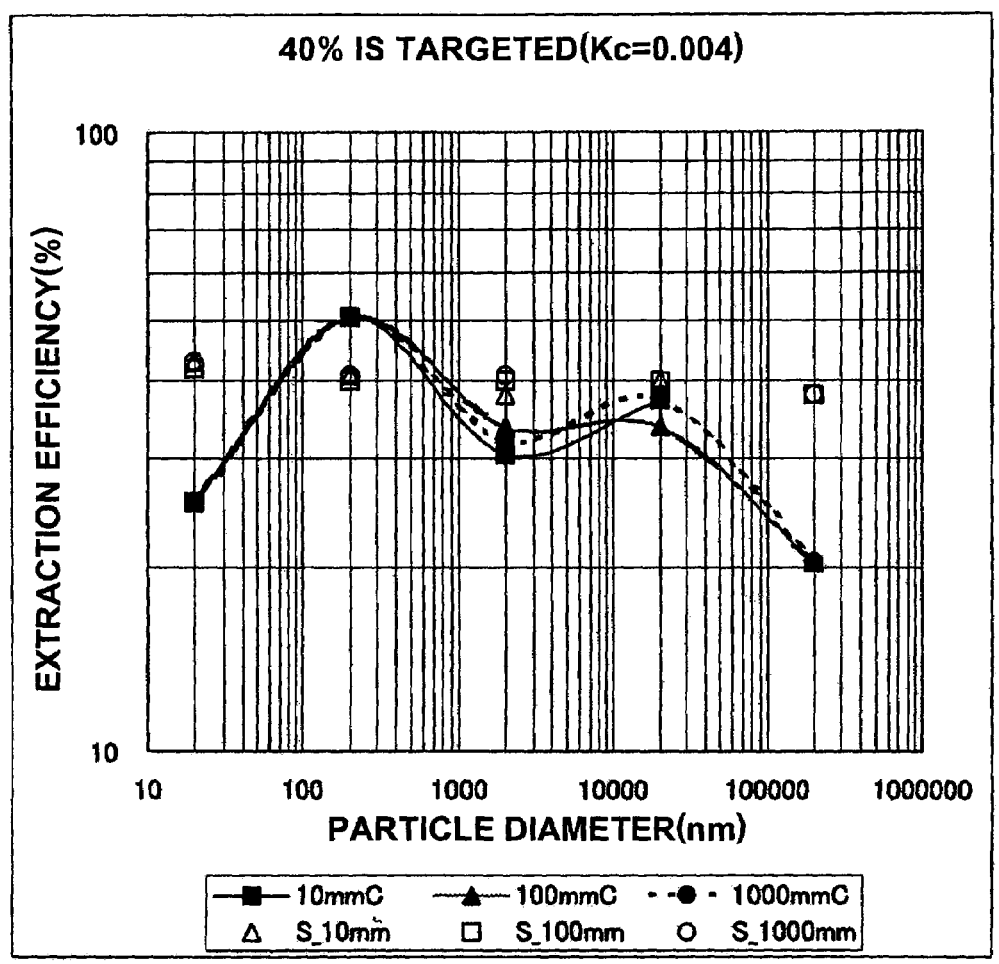
FIG. 7E is a graph showing comparisons of results on a relationship between the particle diameter and light extraction efficiency, obtained by the method of the present invention and by the computer simulation (light extraction efficiency of 40% is targeted).
Figure 8A:
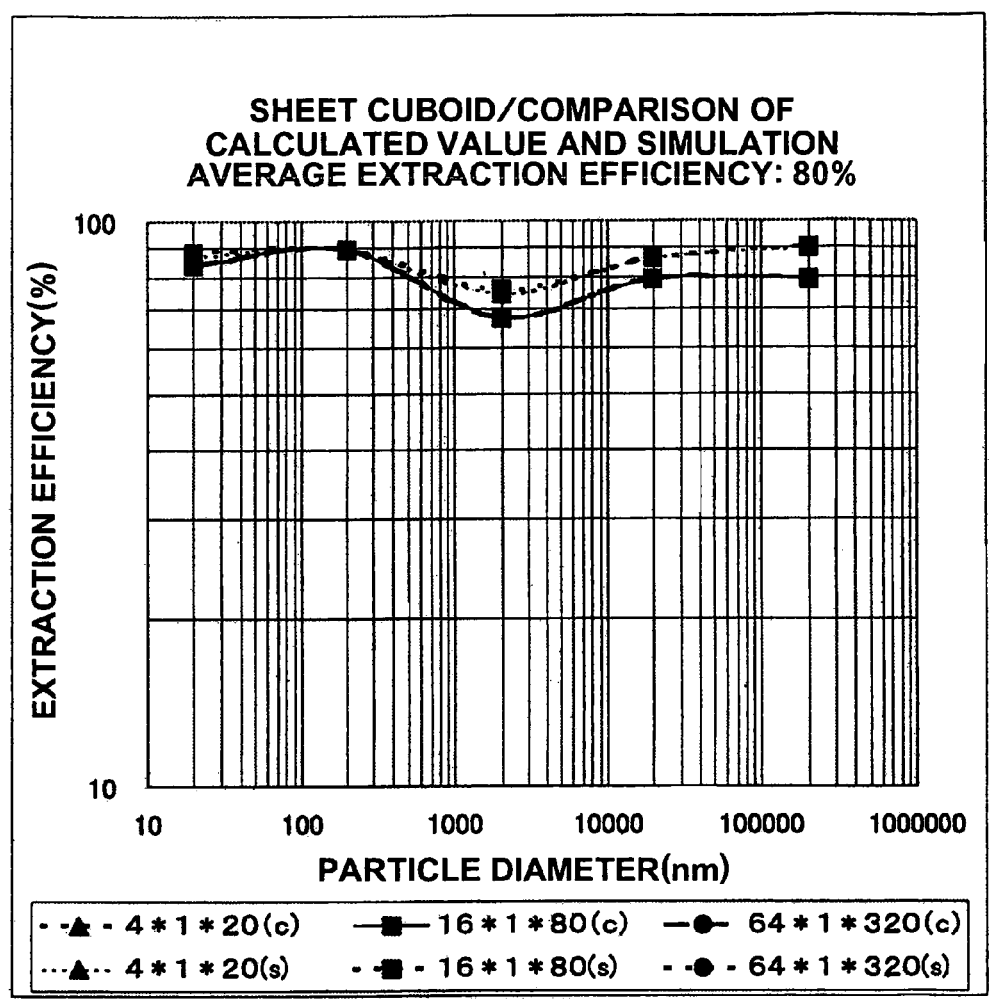
FIG. 8A is a graph showing the comparisons of results on a relationship between the particle diameter and the light extraction efficiency in a sheet light guide, obtained by calculation and simulation (average light extraction efficiency: 80%).
Figure 8C:
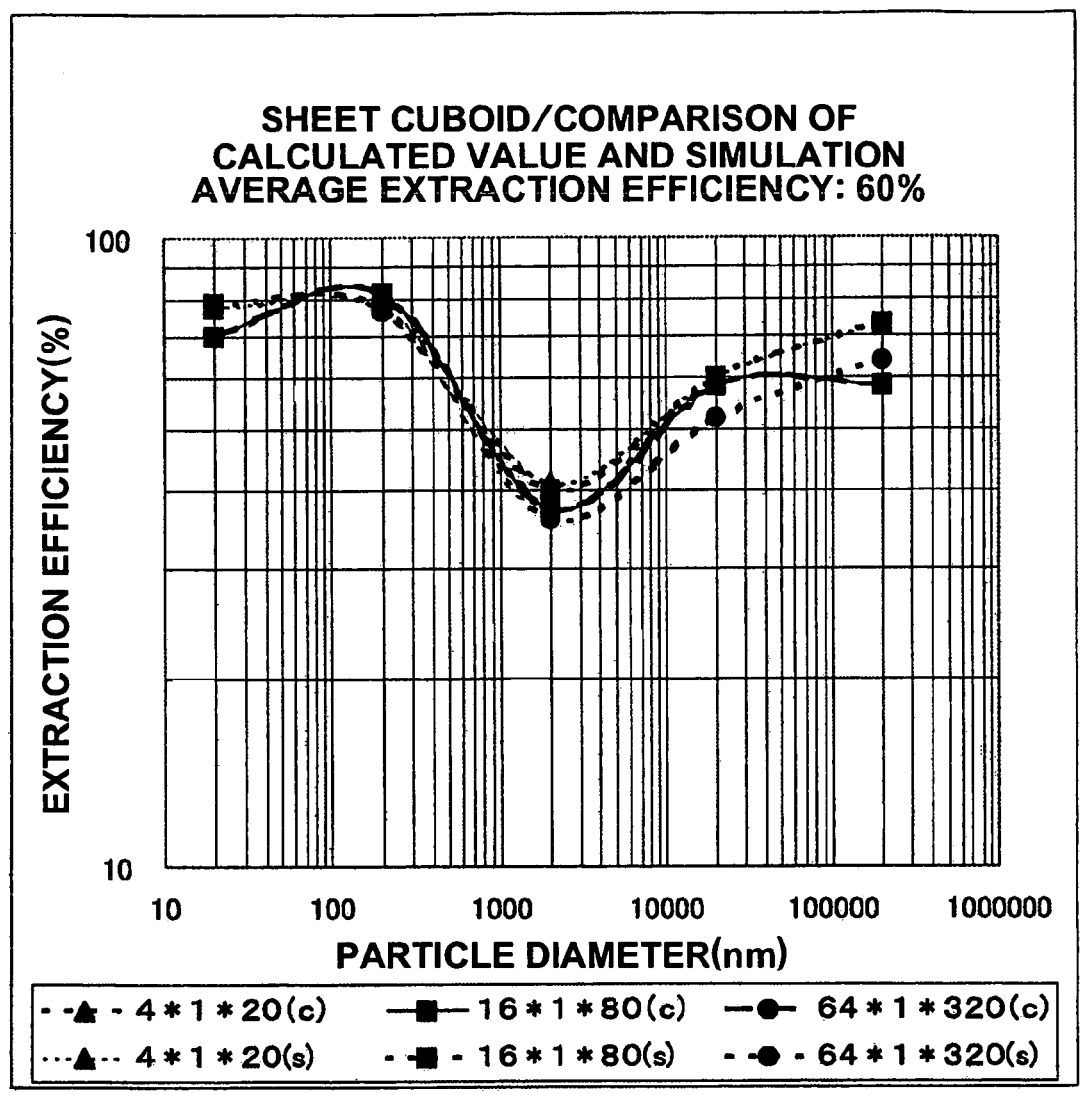
FIG. 8C is a graph showing the comparisons of results on a relationship between the particle diameter and the light extraction efficiency in a sheet light guide, obtained by the calculation and the simulation (average light extraction efficiency: 60%).
Figure 9A:
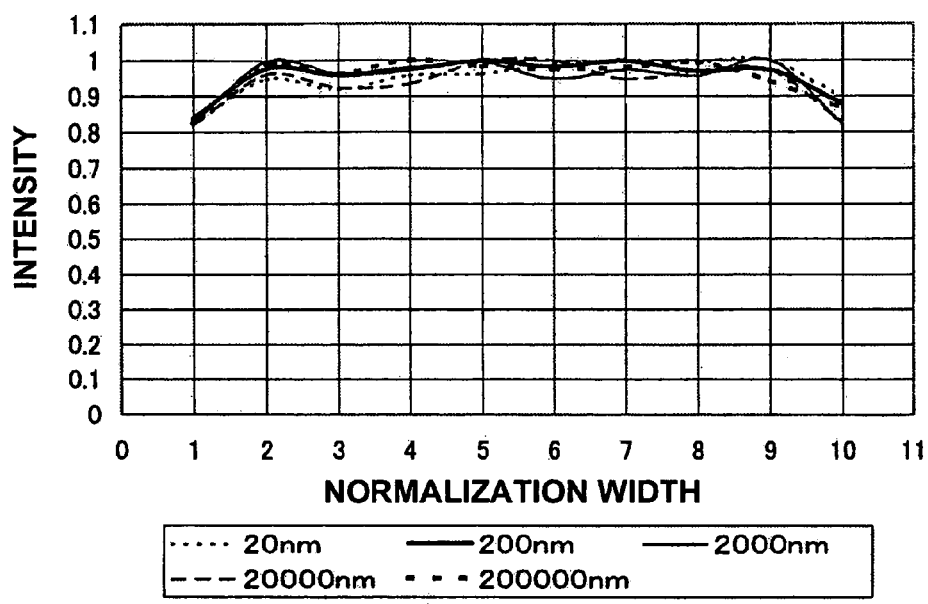
FIG. 9A is a graph showing distribution characteristics of emitted light intensity in the sheet light guide when the sheet size is small.
Figure 9B:
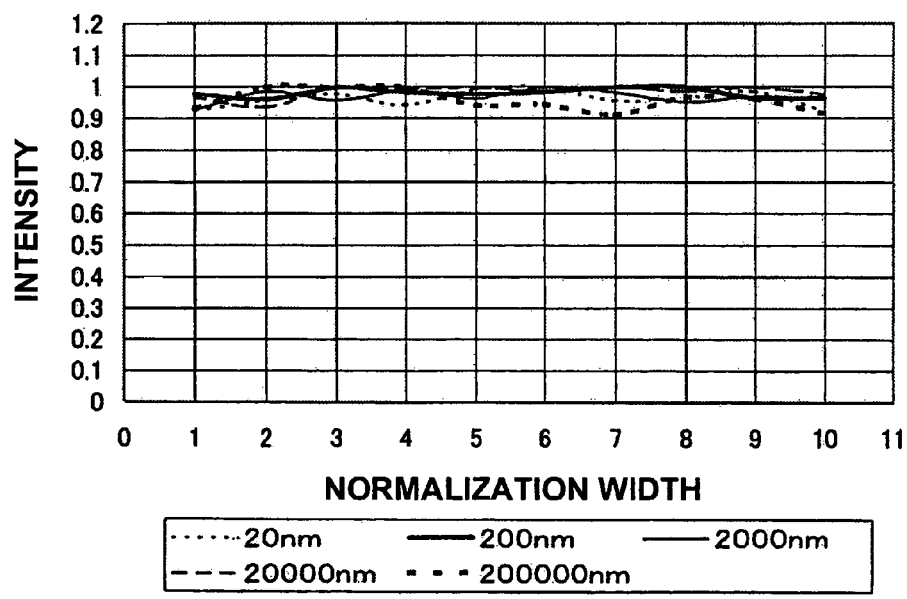
FIG. 9B is a graph showing the distribution characteristics of the emitted light intensity in the sheet light guide when the sheet size is medium.
Figure 9C:
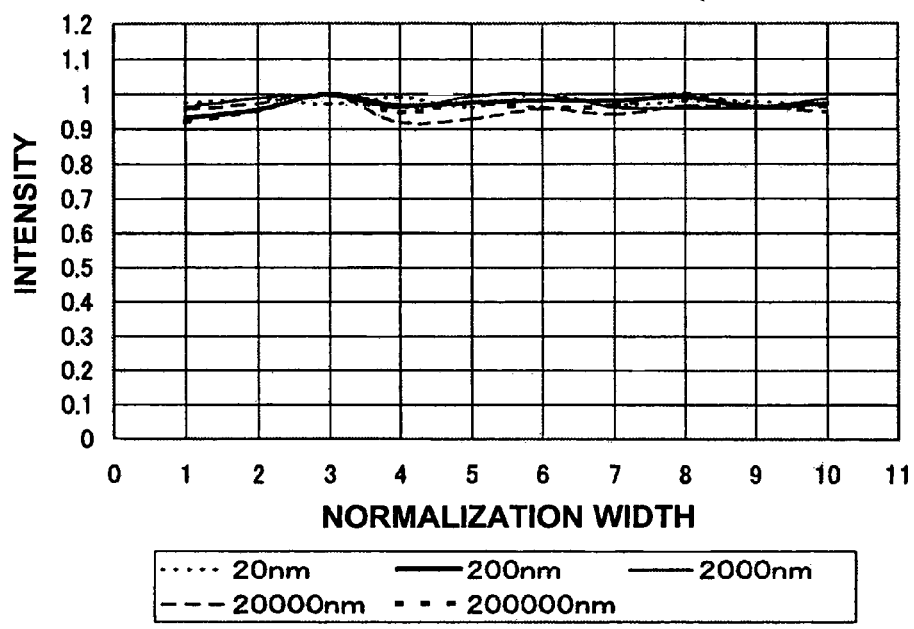
FIG. 9C is a graph showing the distribution characteristics of the emitted light intensity in the sheet light guide when the sheet size is large.
Figure 10:
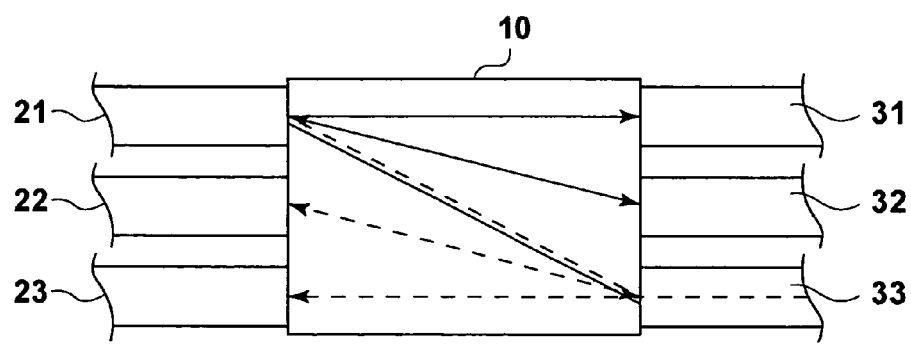
FIG. 10 is a plan view showing a schematic shape of the sheet light guide.
Figure 11:
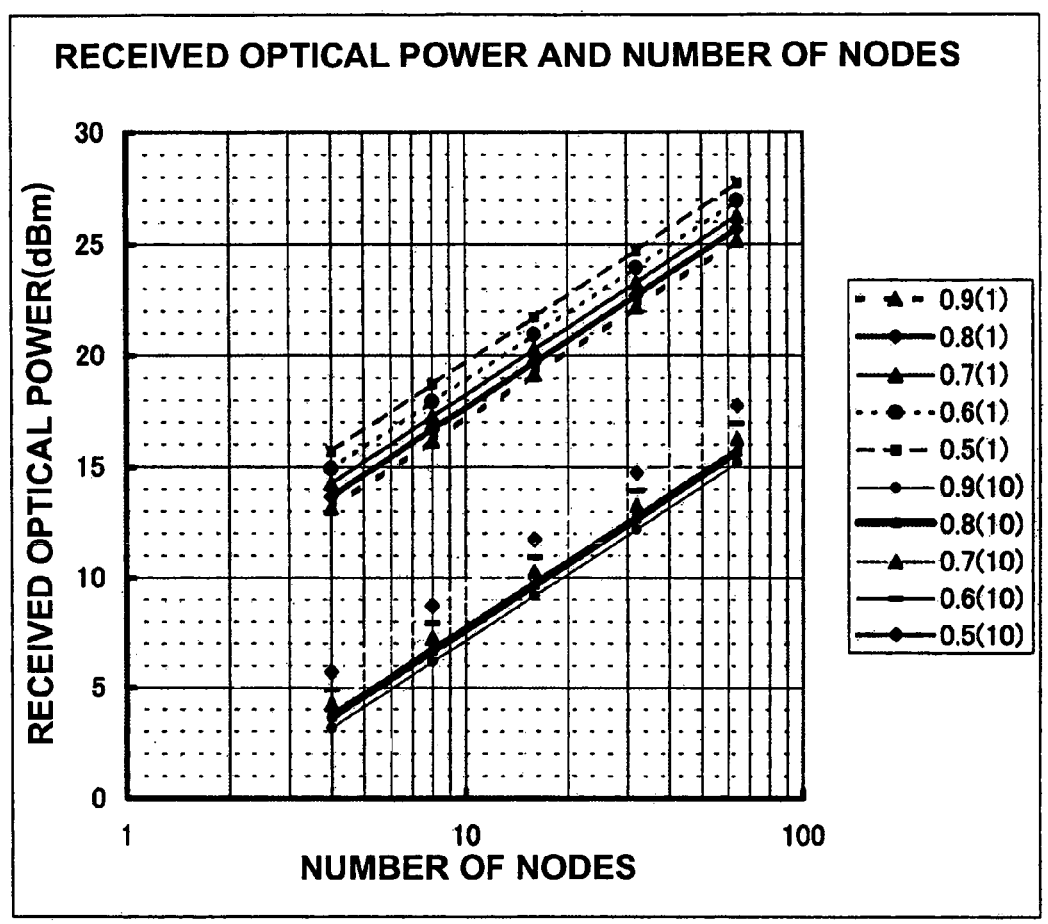
FIG. 11 is a graph showing a relationship between received optical power and the number of nodes in a communication system using the sheet light guide.
Figure 13A:
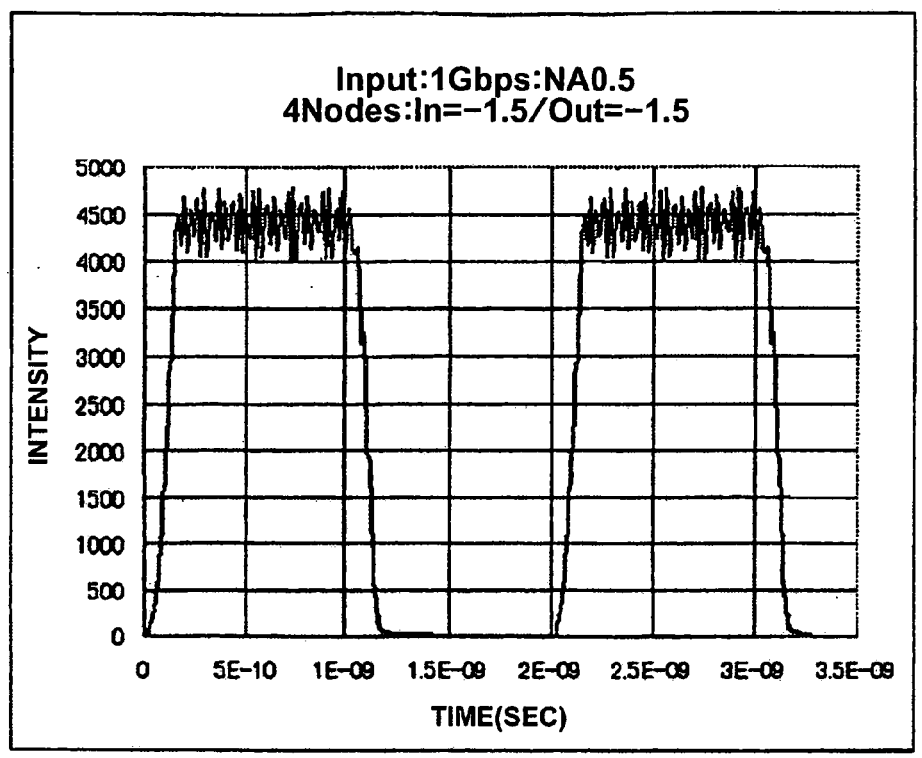
FIG. 13A is a graph showing an example of a waveform distortion of signal light in a communication system using the sheet light guide, of which number of nodes is four.
Figure 13B:
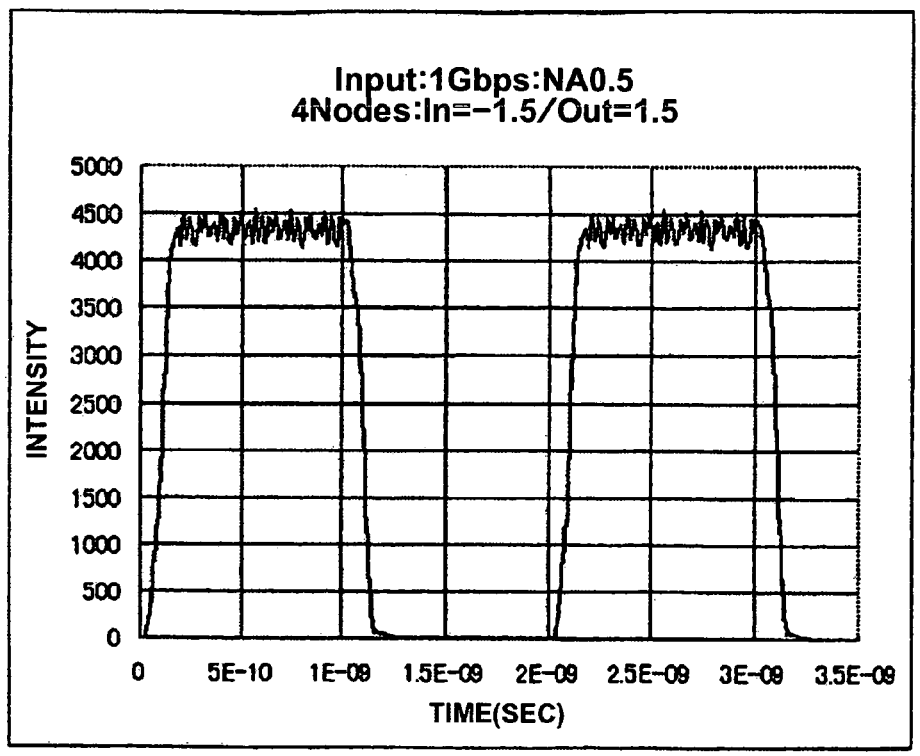
FIG. 13B is a graph showing another example of the waveform distortion of the signal light in the communication system using the sheet light guide, of which number of nodes is four.
Figure 14A:
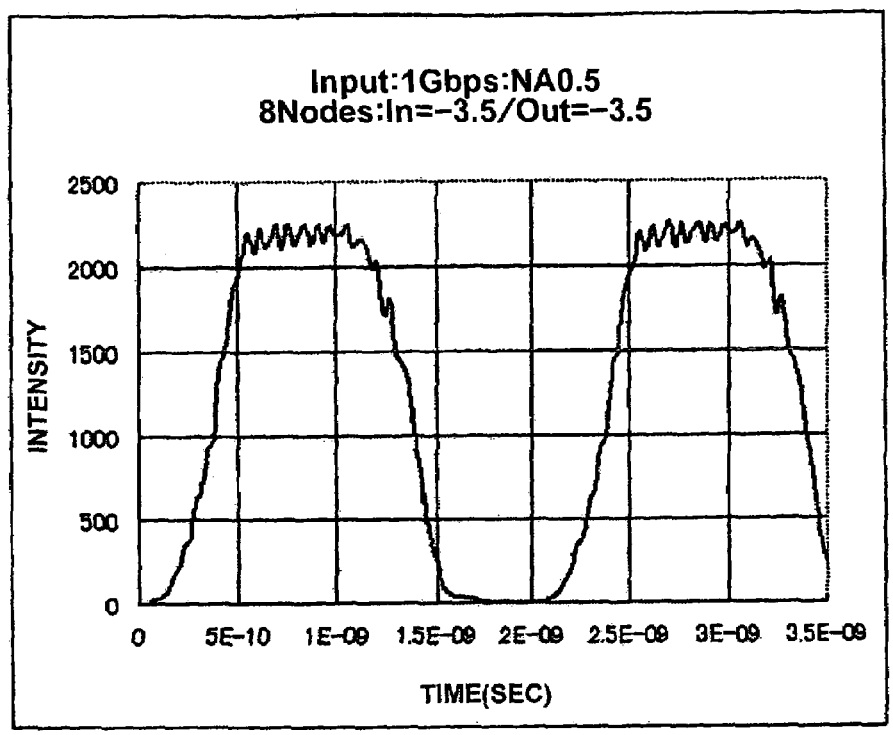
FIG. 14A is a graph showing an example of the waveform distortion of the signal light in a communication system using the sheet light guide, of which number of nodes is eight.
Figure 14B:
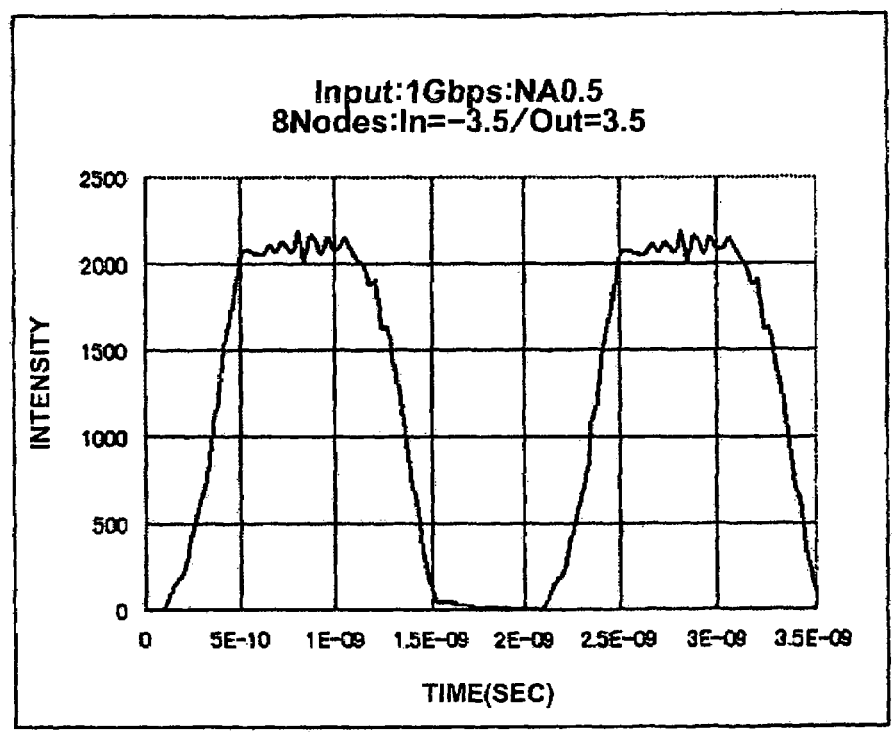
FIG. 14B is a graph showing another example of the waveform distortion of the signal light in the communication system using the sheet light guide, of which number of nodes is eight.
Figure 15A:
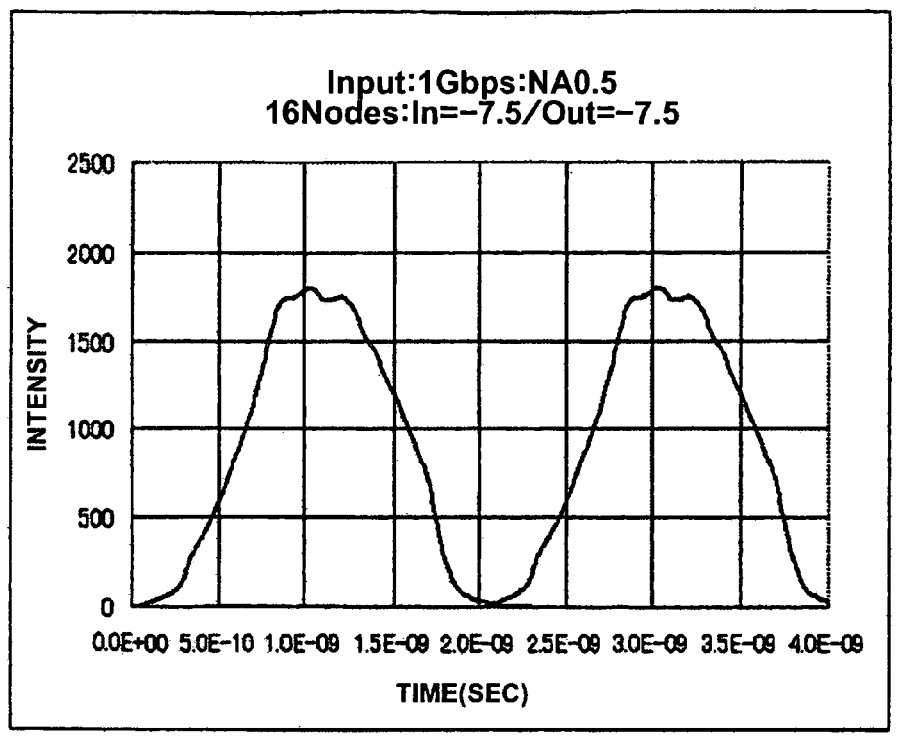
FIG. 15A is a graph showing an example of the waveform distortion of the signal light in a communication system using the sheet light guide, of which number of nodes is 16.
Figure 15B:
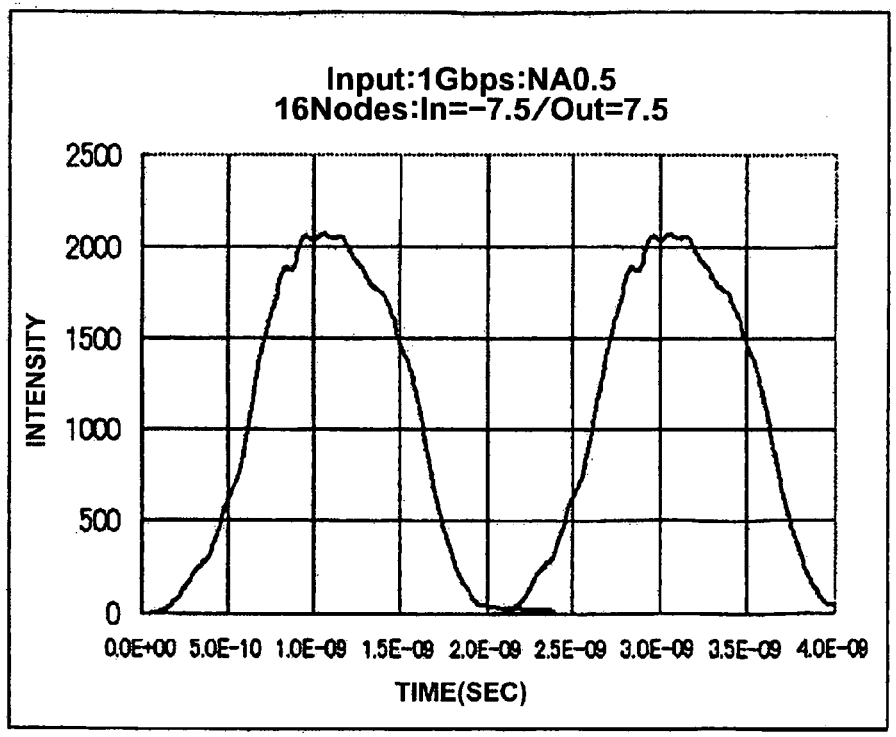
FIG. 15B is a graph showing another example of the waveform distortion of the signal light in the communication system using the sheet light guide, of which number of nodes is 16.
Figure 16:
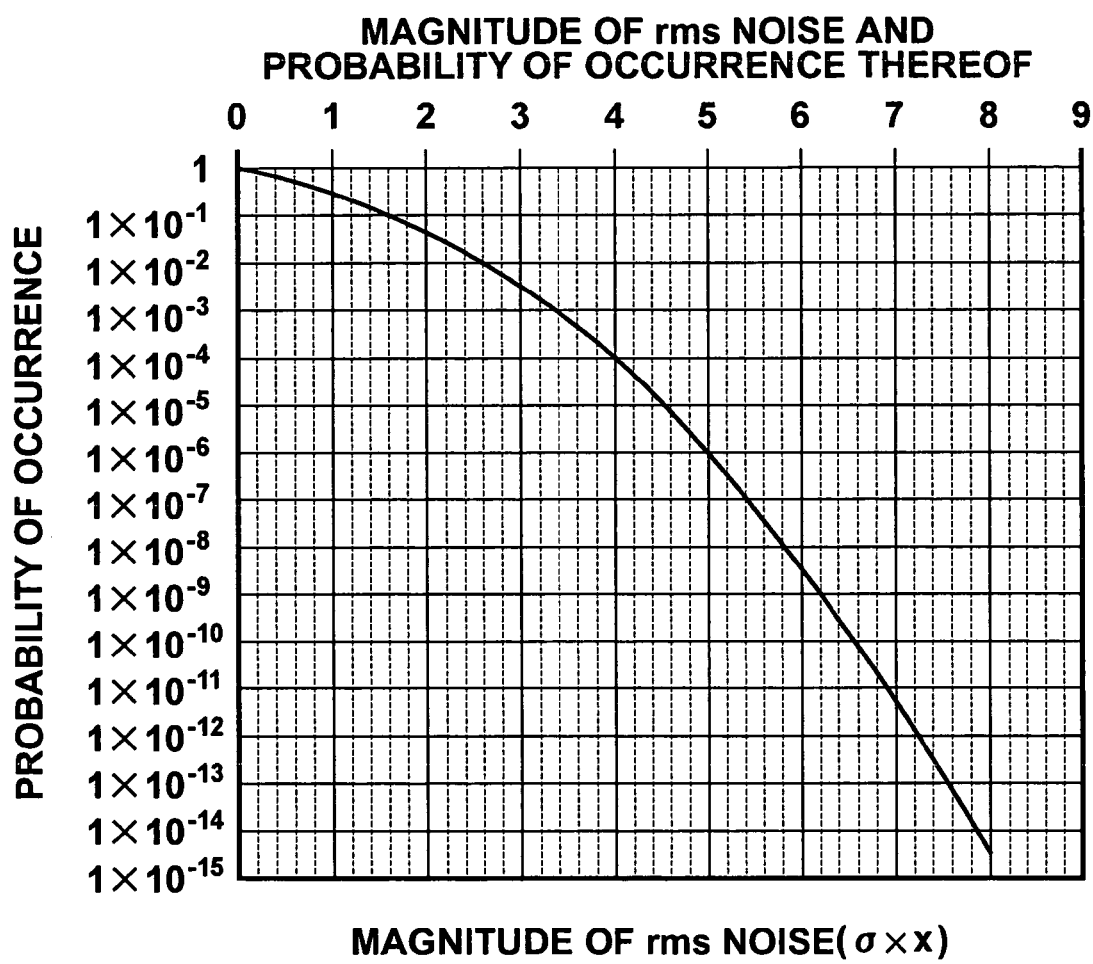
FIG. 16 is a graph showing a relationship between a magnitude of root mean square (rms) noise and a probability of occurrence thereof.
Figure 17:
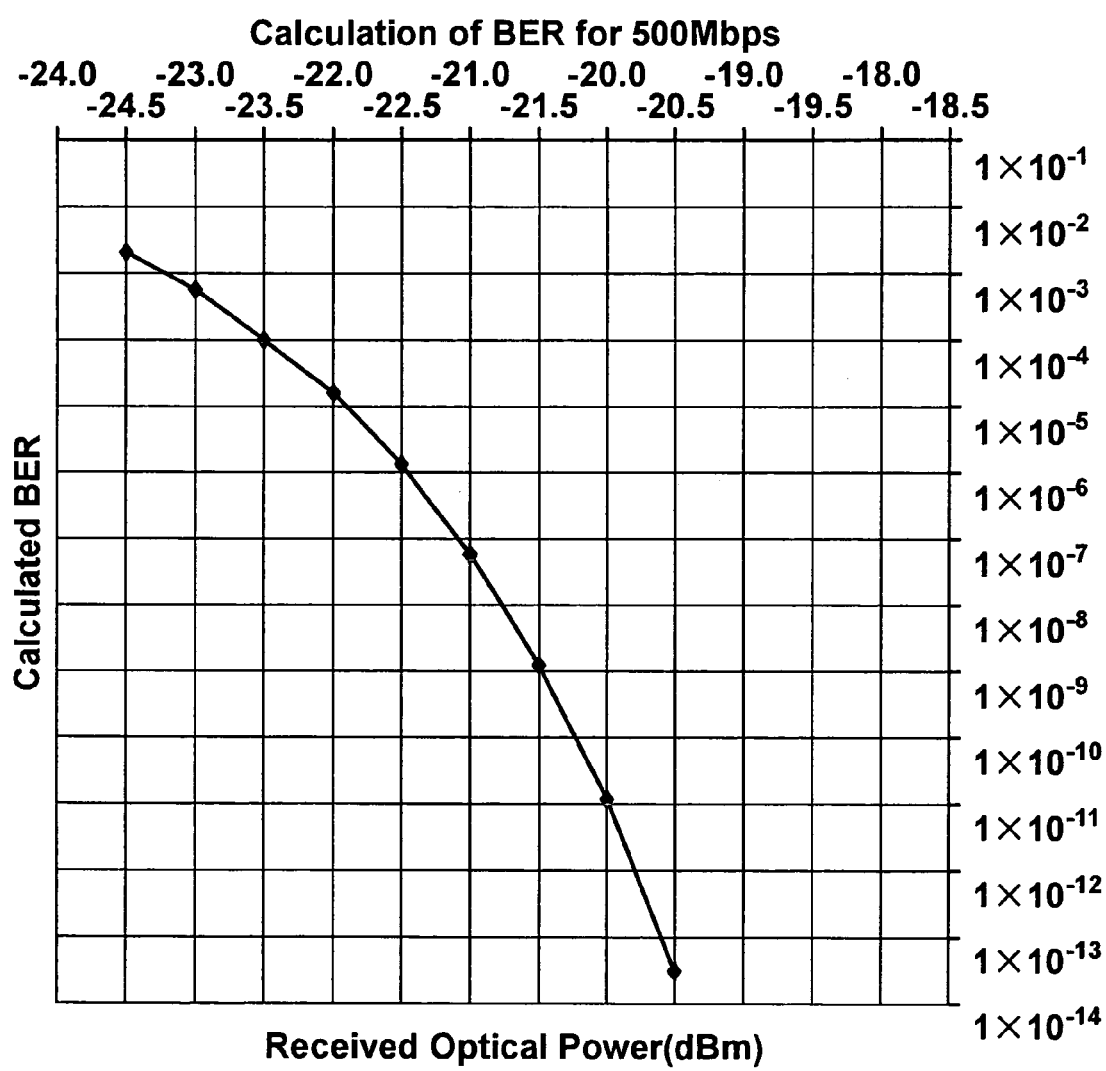
FIG. 17 is a graph showing a relationship between a Bit-Error-Rate (BER) and the received optical power.
Figure 18:
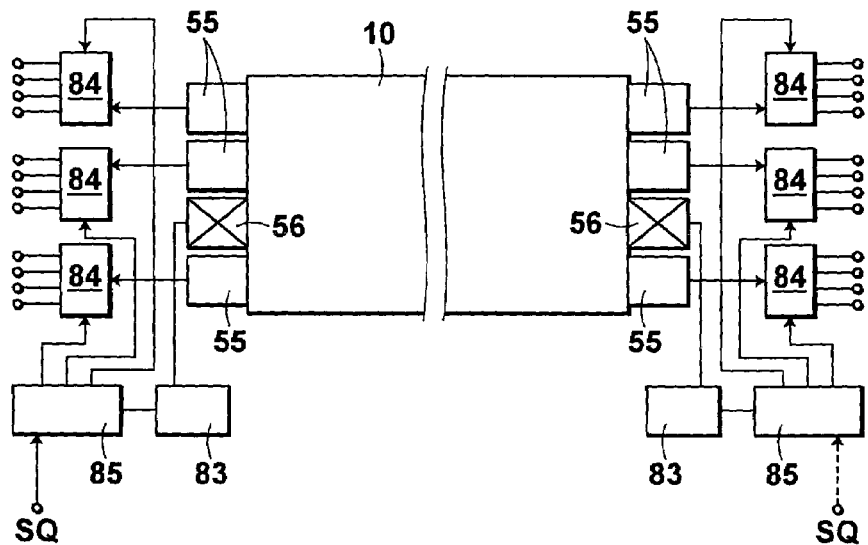
FIG. 18 is a plan view showing a communication system according to an embodiment of the present invention.

FIG. 18 is a view showing a planar shape of a communication system using a sheet light guide according to an embodiment of the present invention. As illustrated, in this system, a sheet light guide 10 having basically the same configuration as that previously shown in FIG. 10 is used. Moreover, three photodetectors 55 and one light transmitter 56 are optically coupled directly to each of one and the other end surfaces of the sheet light guide 10, each of which serves as an incident/emitting end surface thereof. Specifically, in this embodiment, a communication system of four-node type, which is capable of two-way communication, is constituted.

Demultiplexers 84 are individually connected to the photodetectors 55. Moreover, laser diodes capable of, for example, high-speed direct modulations are applied as the light transmitters 56, and the light transmitters 56 are driven by LD drivers 83. Operations of the LD drivers 83 and the demultiplexers 84 are controlled by controllers 85.

An operation of the communication system concerned will be described below by taking as an example the case of propagating signal light from the left side to the right side in the drawing. To the controller 85 on the left side in the drawing, a signal SQ carrying information for four channels is inputted in series while being subjected to time division. The controller 85 controls the operation of the LD driver 83 based on the received signal SQ, and allows the LD driver 83 to drive the laser diode constituting the light transmitter 56 to perform the direct modulation. Signal light for the four channels, which is thus emitted from the light transmitter 56, propagates through the sheet light guide 10, and is received by the three photodetectors 55 on the right side of the drawing. Electrical signals which are obtained by photoelectric conversions performed by the respective photodetectors 55 and are outputted therefrom are individually inputted to the demultiplexers 84. Each of the demultiplexers 84 separates the electrical signal for the four channels, which are inputted thereto in series, toward lines individually separate from one another, and outputs the separated electrical signals thereto.

In such away, in this embodiment, each electrical signal for the four channels is transmitted in parallel to three lines.

When the signal division thus described is attempted to be performed only by the sheet light guide 10, thirteen nodes in total, which is the sum of nodes for 12 channels and a node for the light transmission, will be required. When the number of nodes of the sheet light guide 10 is increased as described above, there is a possibility that an S/N of the transmission signal is lowered. However, the signal division is electrically performed by use of the demultiplexers 84, and thus the number of nodes is restricted to be small, thus making it possible to prevent the lowering of the S/N of the transmission signal.

Figure 19:
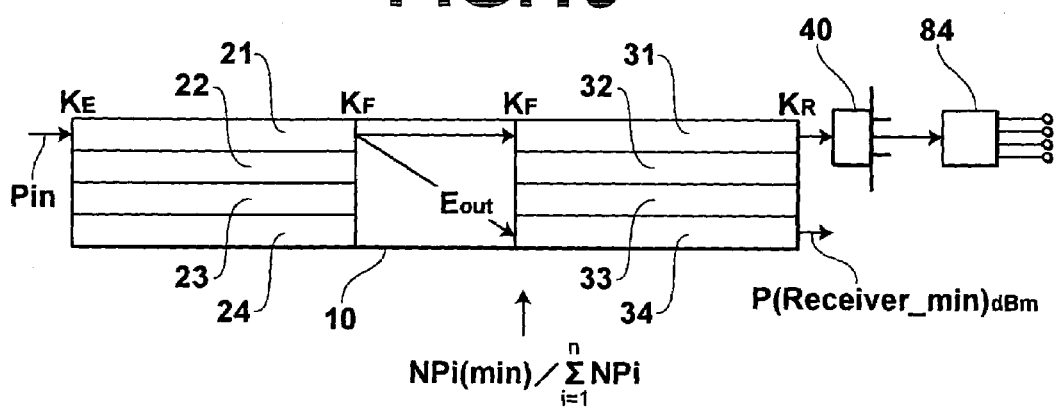
FIG. 19 is a plan view showing a communication system according to another embodiment of the present invention.

Next, FIG. 19 is a view showing a planar shape of a communication system using a sheet light guide according to another embodiment of the present invention. As illustrated, this system is four-node type formed by coupling, as an example, four optical fibers 21, 22, 23 and 24 to one end surface of a sheet light guide 10 and also four optical fibers 31, 32, 33 and 34 to the other end surface. The sheet light guide 10 is formed to have a thickness of 1 mm, a width of 4 mm, and a length of 30 mm.

Also in this embodiment, a demultiplexer 84 similar to those described above is connected to a photodetector 40 coupled to the optical fiber 31. Thus, a similar effect to that in the above-described embodiment can be obtained. Note that, also in this system, when the system is formed to be capable of the two-way communication, a light transmitter is coupled to one of the other optical fibers 32, 33 and 34 arranged along the optical fiber 31 described above, and the photodetectors are coupled to the other two of the optical fibers 32, 33 and 34. In this case, it is satisfactory if the demultiplexers 84 are connected also to the remaining two photodetectors in a similar way to the above.

Here, in this embodiment, an acceptable bit error rate BER(accept) is $1 \times 10^{-11}$ as a limit regarded in general to be free from an error. Meanwhile, it is assumed that light extraction efficiency Eout of the above-described sheet light guide 10 is equal to 0.9. In this case, a particle density Np becomes $0.93 \times 10^4$ (pieces/mm$^3$) based on the above-mentioned expression (14) when a particle diameter is assumed to be 7 μm. In other words, the particle diameter and the particle density Np are set at these values in advance, and thus expression (14) is satisfied.

Next, a signal-to-noise ratio (S/N) of this system is obtained. According to a simulation based on the above-mentioned expression (28), the minimum received optical power P(Receiver_min)$_{dBm}$ obtained by the photodetector 40 in this case becomes 10.5 (dBm). Here, Pin is set equal to 1.0 mW, Eout is set equal to 0.9, and NPi(min)/ΣNPi is set approximately equal to 0.15.

Then, it is assumed that the above-mentioned expressions (28) and (29) are satisfied at an arbitrary node of which optical power becomes the minimum received optical power P(Receiver_min)$_{dBm}$. Note that, based on an empirical fact and a tolerance analysis, it is understood here that each of values of a coupling loss $K_E$ of the light emitter and the optical fiber, a coupling loss $K_F$ of the optical fiber and the sheet light guide, and a coupling loss $K_R$ of the optical fiber and the photodetector is approximately 1 dB in expression (29).

Next, an internal loss $K_{FT}$ of the optical fiber is obtained. Here, it is assumed to use a plastic optical fiber in which a core is formed of PMMA. A propagation loss of the optical fiber in this case ranges approximately from 0.15 to 0.2 dB/m. When it is assumed that a fiber length of approximately 10 m in total is required on both ends of the sheet light guide 10 in the case of considering wiring in a device in which the communication system concerned is installed, the internal loss $K_{FI}$ of the optical fiber becomes approximately 2 dB at the maximum. A multiplication of the internal loss $K_{FI}$ and the other coupling losses in expression (29) brings the minimum optical power PRmin required for the photodetector, which is equal to 15.5 (dBm). When being displayed in Watts, the minimum optical power PRmin is equal to 0.028 (mW).

Accordingly, a signal current Sc becomes equal to $8.01 \times 10^{-6}$ (A) based on the above-mentioned expression (33) on the assumption that a band is 500 MHz (in this band, it is not necessary to consider a waveform distortion considering the results of the simulation). Meanwhile, a noise component Noise(System_rms) is equal to $5.28 \times 10^{-7}$ (A) based on the above-mentioned expressions (31a) and (31b). Therefore, the signal-to-noise ratio (S/N) in this case becomes 15.2.

Here, V(Thresh) is defined equal to S(PRmin)v/2, and the above-described result is assigned to expression (37). Then, because 15.2/2=7.6 is established, if a probability at which a noise amplitude of Noise(System_rms)·7.6 occurs is smaller than a desired BER, then the above-mentioned expression (36) is satisfied. The probability of occurrence of Noise(System_rms)·Q in this case is $4 \times 10^{-15}$. Specifically, the condition of the above-mentioned expression (36) is satisfied because the acceptable bit error rate BER(accept) is equal to $1 \times 10^{-11}$.

What is claimed is:

1. A communication system using a sheet light guide, which is formed to contain light-scattering particles in a sheet optical medium, and propagates signal light incident from one end surface thereof to the other end surface side while scattering the signal light by the particles, the system comprising:
   a photodetector which is coupled to the other end surface of the sheet light guide and detects the signal light; and
   a demultiplexer which distributes an output of the photodetector to a plurality of lines,
   wherein, when a scattering cross section of the particles is $\Phi$, a length of the optical medium in a light propagation direction is $L_G$, a particle density is Np, and a correction coefficient is $K_C$, a value of $\Phi \cdot Np \cdot L_G \cdot K_c$ is 0.9 or less.

2. The communication system using a sheet light guide according to claim 1, wherein,
   when light extraction efficiency Eout in the sheet light guide is represented as:

$Eout = \exp\{-(\Phi \cdot Np \cdot L_G K_C)\} K_L$ where $K_L$ is a loss coefficient obtained by synthesizing internal transmissivity and the like of the sheet light guide,
   when a minimum received optical power P(Receiver_min)$_{dBm}$ is represented as:

$P(\text{Receiver\_min})_{dBm} = -10 \text{Log}\{Pin \bullet Eout \bullet (NPi(\min)/\Sigma NPi) \bullet \pi/4\} \bullet K_T$ where Pin is incident optical power, NPi(min) is optical power of a segment in which the optical power becomes minimum, $\Sigma$NPi is a sum of optical powers of respective segments, and $K_T$ is a coupling loss of a light emitter, optical fibers, the photodetector and the like, and
   when a signal voltage determined from the minimum received optical power P(Receiver_min)$_{dBm}$ and a load resistance of the photodetector is S(PRmin)v, rms noise of the system is Noise(System_rms), and an arbitrary threshold in binarization is V(Thresh),
   the following is satisfied:

$\{S(PRmin)v - V(Thresh)\} > \text{Noise}(System\_rms) \cdot Q$ where Q is a proportionality constant.

3. The communication system using a sheet light guide according to claim 1, wherein, when rms noise of the system is Noise(System_rms), an acceptable bit error rate is BER(accept), and a probability of occurrence of the Noise(System_rms) is Pr(Noise(System_rms)), the following is satisfied:

$\Pr(\text{Noise}(System\_rms) \cdot Q) \leq BER(\text{accept})$ where Q is a proportionality constant.

4. The communication system using a sheet light guide according to claim 3, wherein,
   when light extraction efficiency Eout in the sheet light guide is represented as:

$Eout = \exp\{-(\Phi \cdot Np \cdot L_G K_C)\} \cdot K_L$ where $K_L$ is a loss coefficient obtained by synthesizing internal transmissivity and the like of the sheet light guide,
   when a minimum received optical power P(Receiver_min)$_{dBm}$ is represented as:

$P(\text{Receiver\_min})_{dBm} = -10 \text{Log}\{Pin \bullet Eout \bullet (NPi(\min)/\Sigma NPi) \bullet \pi/4\} \bullet K_T$ where Pin is incident optical power, NPi(min) is optical power of a segment in which the optical power becomes minimum, $\Sigma$NPi is a sum of optical powers of respective segments, and $K_T$ is a coupling loss of a light emitter, optical fibers, the photodetector and the like, and
   when a signal voltage determined from the minimum received optical power P(Receiver_min)$_{dBm}$ and a load resistance of the photodetector is S(PRmin)v, rms noise of the system is Noise(System_rms), and an arbitrary threshold in binarization is V(Thresh),
   the following is satisfied:

$\{S(PRmin)v - V(Thresh)\} > \text{Noise}(System\_rms) \cdot Q$.

5. The communication system using a sheet light guide according to claim 1, wherein the sheet light guide comprises a plurality of optical media.

6. The communication system using a sheet light guide according to claim 1, wherein the sheet light guide comprises a mixture of non-magnetic conductive particles following the Mie scattering theory and the optical medium.

7. The communication system using a sheet light guide according to claim 2, wherein, when it is assumed that, in the sheet light guide, the light incident thereonto repeats reflection on respective surfaces other than incident/emitting end surfaces according to Snell's Law, and when a refractive index of a surrounding medium is Ns, a refractive index of the optical medium as a matrix is Nm, an incident angle is $\theta$m, and a refraction angle is $\theta$s, if Nm·sin $\theta$m=Ns·sin $\theta$s is established in the case where the particles are not contained, the sheet light guide is formed of an optical medium with a shape satisfying sin $\theta$s>1.

8. The communication system using a sheet light guide according to claim 1, wherein,
   when light extraction efficiency Eout in the sheet light guide is represented as:

$Eout = \exp\{-(\Phi \cdot Np \cdot L_G \cdot K_C)\} \cdot K_L$ where $K_L$ is a loss coefficient obtained by synthesizing internal transmissivity and the like of the sheet light guide, when a minimum received optical power P(Receiver_min)$_{dBm}$ is represented as:

$$P(\text{Receiver\_min})_{dBm} = -10\text{Log}\{Pin \bullet Eout \bullet (NPi(\min)/\Sigma NPi) \bullet \pi/4\} \bullet K_T$$

where Pin is incident optical power, NPi(min) is optical power of a segment in which the optical power becomes minimum, ΣNPi is a sum of optical powers of respective segments, and $K_T$ is a coupling loss of a light emitter, optical fibers, the photodetector and the like, and when a signal voltage determined from the minimum received optical power P(Receiver_min)$_{dBm}$ and a load resistance of the photodetector is S(PRmin)v, rms noise of the system is Noise(System_rms), and an arbitrary threshold in binarization is V(Thresh), the following is satisfied:

$$\{S(P R\min)v - V(\text{Thresh})\} > \text{Noise}(\text{System\_rms}) \cdot Q.$$

9. The communication system using a sheet light guide according to claim 1, wherein. when it is assumed that, in the sheet light guide, a light beam emitted from at least one emitting end surface obeys Snell's Law in reflection/refraction thereof on the emitting end surface, and when a refractive index of a surrounding medium is Ns, a refractive index of the optical medium serving as a matrix is Nm, an incident angle is θm, and a refraction angle is θs, if Nm·sin θm=Ns·sin θs is established in the case where the particles are not contained, the sheet light guide is formed of an optical medium with a shape satisfying sin θs<1.

10. A communication system using a sheet light guide, which is formed to contain light-scattering particles in a sheet optical medium, and propagates signal light incident from one end surface thereof to the other end surface side while scattering the signal light by the particles, the system comprising:

a photodetector which is coupled to the other end surface of the sheet light guide and detects the signal light; and a demultiplexer which distributes an output of the photodetector to a plurality of lines, wherein the sheet light guide comprises a mixture of non-magnetic conductive particles following the Mie scattering theory and the optical medium.

11. The communication system using a sheet light guide according to claim 10, wherein, when it is assumed that, in the sheet light guide, the light incident thereonto repeats reflection on respective surfaces other than incident/emitting end surfaces according to Snell's Law, and when a refractive index of a surrounding medium is Ns, a refractive index of the optical medium as a matrix is Nm, an incident angle is θm, and a refraction angle is θs, if Nm·sin θm=Ns·sin θs is established in the case where the particles are not contained, the sheet light guide is formed of an optical medium with a shape satisfying sin θs>1.

12. The communication system using a sheet light guide according to claim 10, wherein the sheet light guide comprises a mixture of the particles and the optical medium with a particle density gradient.

13. The communication system using a sheet light guide according to claim 10, wherein the sheet light guide comprises a mixture of the particles and the optical medium with a particle density gradient.

14. The communication system using a sheet light guide according to claim 10, wherein the sheet light guide comprises a plurality of optical media.

15. The communication system using a sheet light guide according to claim 10, wherein, when it is assumed that, in the sheet light guide, a light beam emitted from at least one emitting end surface obeys Snell's Law in reflection/refraction thereof on the emitting end surface, and when a refractive index of a surrounding medium is Ns, a refractive index of the optical medium serving as a matrix is Nm, an incident angle is θm, and a refraction angle is θs, if Nm·sin θm=Ns·sin θs is established in the case where the particles are not contained, the sheet light guide is formed of an optical medium with a shape satisfying sin θs<1.

16. The communication system using a sheet light guide according to claim 10, wherein, when rms noise of the system is Noise(System_rms), an acceptable bit error rate is BER(accept), and a probability of occurrence of the Noise (System_rms) is Pr(Noise(System_rms)), the following is satisfied:

$$Pr(\text{Noise}(\text{System\_rms}) \cdot Q) \leq BER(\text{accept})$$

where Q is a proportionality constant.

* * * * *